(12) United States Patent
Xu et al.

(10) Patent No.: US 9,471,290 B2
(45) Date of Patent: *Oct. 18, 2016

(54) UTILIZING SPECIAL PURPOSE ELEMENTS TO IMPLEMENT A FSM

(71) Applicant: Micron Technology, Inc., Boise, ID (US)

(72) Inventors: Junjuan Xu, San Jose, CA (US); Paul Glendenning, Woodside, CA (US)

(73) Assignee: Micron Technology, Inc., Boise, ID (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/478,712

(22) Filed: Sep. 5, 2014

(65) Prior Publication Data

US 2014/0380288 A1    Dec. 25, 2014

Related U.S. Application Data

(63) Continuation of application No. 13/357,496, filed on Jan. 24, 2012, now Pat. No. 8,843,911.

(60) Provisional application No. 61/436,022, filed on Jan. 25, 2011.

(51) Int. Cl.
   *G06F 9/45* (2006.01)
   *G06F 9/44* (2006.01)

(52) U.S. Cl.
   CPC .............. *G06F 8/447* (2013.01); *G06F 8/443* (2013.01); *G06F 9/444* (2013.01)

(58) Field of Classification Search
   None
   See application file for complete search history.

(56) References Cited

U.S. PATENT DOCUMENTS

| | | |
|---|---|---|
| 5,081,608 A | 1/1992 | Tamura et al. |
| 5,537,580 A | 7/1996 | Giomi et al. |
| 5,729,678 A | 3/1998 | Hunt et al. |

(Continued)

FOREIGN PATENT DOCUMENTS

| | | |
|---|---|---|
| CN | 1894559 A | 1/2007 |
| CN | 101013452 A | 8/2007 |

(Continued)

OTHER PUBLICATIONS

"European Application Serial No. 12739387.4, Extended European Search Report mailed May 27, 2014", 8 pgs.

(Continued)

*Primary Examiner* — Chuck Kendall
(74) *Attorney, Agent, or Firm* — Schwegman Lundberg & Woessner, P.A.

(57) ABSTRACT

Apparatus, systems, and methods for a compiler are described. One such compiler generates machine code corresponding to a set of elements including a general purpose element and a special purpose element. The compiler identifies a portion in an arrangement of relationally connected operators that corresponds to a special purpose element. The compiler also determines whether the portion meets a condition to be mapped to the special purpose element. The compiler also converts the arrangement into an automaton comprising a plurality of states, wherein the portion is converted using a special purpose state that corresponds to the special purpose element if the portion meets the condition. The compiler also converts the automaton into machine code. Additional apparatus, systems, and methods are disclosed.

18 Claims, 14 Drawing Sheets

(56) References Cited

U.S. PATENT DOCUMENTS

| | | | |
|---|---|---|---|
| 5,784,298 A | 7/1998 | Hershey et al. | |
| 5,831,853 A | 11/1998 | Bobrow et al. | |
| 6,262,594 B1 | 7/2001 | Cheung et al. | |
| 6,507,903 B1 | 1/2003 | Beatty et al. | |
| 6,564,336 B1 | 5/2003 | Majkowski | |
| 6,748,588 B1 | 6/2004 | Fraser et al. | |
| 6,832,378 B1 | 12/2004 | Beatty et al. | |
| 7,020,850 B2 | 3/2006 | Raghavan et al. | |
| 7,039,233 B2 | 5/2006 | Mori et al. | |
| 7,140,018 B1 | 11/2006 | Beatty et al. | |
| 7,170,891 B2 | 1/2007 | Messenger | |
| 7,171,561 B2 | 1/2007 | Noga | |
| 7,392,229 B2 | 6/2008 | Harris et al. | |
| 7,392,409 B2 | 6/2008 | Tateyama | |
| 7,487,131 B2 | 2/2009 | Harris et al. | |
| 7,487,542 B2 | 2/2009 | Boulanger et al. | |
| 7,505,893 B2 | 3/2009 | Mizutani et al. | |
| 7,546,354 B1 | 6/2009 | Fan et al. | |
| 7,693,853 B2 | 4/2010 | Bellamy et al. | |
| 7,761,851 B2 | 7/2010 | Bailey et al. | |
| 7,774,286 B1 | 8/2010 | Harris | |
| 7,917,684 B2 | 3/2011 | Noyes et al. | |
| 7,970,964 B2 | 6/2011 | Noyes | |
| 8,051,022 B2 | 11/2011 | Pandya | |
| 8,065,249 B1 | 11/2011 | Harris | |
| 8,140,780 B2 | 3/2012 | Noyes | |
| 8,601,013 B2 | 12/2013 | Dlugosch | |
| 8,726,253 B2 | 5/2014 | Glendenning et al. | |
| 8,726,256 B2 | 5/2014 | Xu et al. | |
| 8,788,991 B2 | 7/2014 | Xu et al. | |
| 8,843,911 B2* | 9/2014 | Xu et al. | 717/153 |
| 2003/0014743 A1 | 1/2003 | Cooke et al. | |
| 2003/0066050 A1 | 4/2003 | Wang et al. | |
| 2003/0145304 A1 | 7/2003 | Carter | |
| 2004/0133869 A1 | 7/2004 | Sharma | |
| 2005/0268258 A1 | 12/2005 | Decker | |
| 2006/0020589 A1 | 1/2006 | Wu et al. | |
| 2007/0005355 A1 | 1/2007 | Tian et al. | |
| 2007/0179639 A1 | 8/2007 | Sakai | |
| 2007/0192110 A1 | 8/2007 | Mizutani et al. | |
| 2007/0296458 A1 | 12/2007 | Kelem et al. | |
| 2008/0140600 A1 | 6/2008 | Pandya | |
| 2008/0141233 A1 | 6/2008 | Gurevich et al. | |
| 2008/0168013 A1 | 7/2008 | Cadaret | |
| 2008/0201281 A1 | 8/2008 | Graf et al. | |
| 2009/0064095 A1 | 3/2009 | Wallach et al. | |
| 2010/0100518 A1 | 4/2010 | Andrade et al. | |
| 2010/0100691 A1 | 4/2010 | Noyes et al. | |
| 2010/0100714 A1 | 4/2010 | Noyes et al. | |
| 2010/0115347 A1 | 5/2010 | Noyes et al. | |
| 2010/0118425 A1 | 5/2010 | Rafaelof | |
| 2010/0121643 A1 | 5/2010 | Mohajer et al. | |
| 2010/0131935 A1 | 5/2010 | Wang | |
| 2010/0138432 A1 | 6/2010 | Noyes et al. | |
| 2010/0138575 A1 | 6/2010 | Noyes | |
| 2010/0138634 A1 | 6/2010 | Noyes et al. | |
| 2010/0138635 A1 | 6/2010 | Noyes | |
| 2010/0169510 A1 | 7/2010 | Ho et al. | |
| 2010/0174887 A1 | 7/2010 | Pawlowski | |
| 2010/0174929 A1 | 7/2010 | Pawlowski | |
| 2010/0175130 A1 | 7/2010 | Pawlowski | |
| 2010/0185647 A1 | 7/2010 | Noyes | |
| 2010/0293153 A1 | 11/2010 | Zhao et al. | |
| 2010/0325633 A1 | 12/2010 | Eguro et al. | |
| 2010/0332809 A1 | 12/2010 | Noyes et al. | |
| 2011/0145182 A1 | 6/2011 | Dlugosch et al. | |
| 2011/0145271 A1 | 6/2011 | Noyes et al. | |
| 2011/0145544 A1 | 6/2011 | Noyes et al. | |
| 2011/0258360 A1 | 10/2011 | Noyes | |
| 2011/0307433 A1 | 12/2011 | Dlugosch | |
| 2011/0307503 A1 | 12/2011 | Dlugosch | |
| 2012/0192163 A1 | 7/2012 | Glendenning et al. | |
| 2012/0192164 A1 | 7/2012 | Xu et al. | |
| 2012/0192165 A1 | 7/2012 | Xu et al. | |
| 2012/0192166 A1 | 7/2012 | Xu et al. | |
| 2014/0082009 A1 | 3/2014 | Dlugosch | |
| 2014/0229925 A1 | 8/2014 | Glendenning et al. | |
| 2014/0229926 A1 | 8/2014 | Xu et al. | |
| 2015/0046889 A1 | 2/2015 | Xu et al. | |

FOREIGN PATENT DOCUMENTS

| | | |
|---|---|---|
| CN | 101339501 A | 1/2009 |
| CN | 101360088 A | 2/2009 |
| CN | 101499065 A | 8/2009 |
| CN | 101099147 B | 5/2010 |
| CN | 103003792 A | 3/2013 |
| CN | 103430148 A | 12/2013 |
| CN | 103443767 A | 12/2013 |
| CN | 103547998 A | 1/2014 |
| CN | 103547999 A | 1/2014 |
| EP | 2184687 A1 | 5/2010 |
| JP | 04291662 A | 10/1992 |
| JP | 2002358500 A | 12/2002 |
| JP | 2005122466 A | 5/2005 |
| JP | 2005353061 A | 12/2005 |
| JP | 2009093599 A | 4/2009 |
| TW | 401558 B | 8/2000 |
| TW | 505854 B | 10/2002 |
| TW | 505855 B | 10/2002 |
| TW | 505856 B | 10/2002 |
| TW | 200301420 A | 7/2003 |
| TW | 556065 B | 10/2003 |
| TW | 200412724 A | 7/2004 |
| TW | I307030 B | 3/2009 |
| TW | 201025011 A | 7/2010 |
| TW | 201237748 A | 9/2012 |
| TW | 201239765 A | 10/2012 |
| TW | 201246071 A | 11/2012 |
| TW | 201246081 A | 11/2012 |
| WO | WO-2009029698 A1 | 3/2009 |
| WO | WO-2010018710 A1 | 2/2010 |
| WO | WO-2011156634 A2 | 12/2011 |
| WO | WO-2011156634 A3 | 12/2011 |
| WO | WO-2012103143 A2 | 8/2012 |
| WO | WO-2012103146 A2 | 8/2012 |
| WO | WO-2012103148 A2 | 8/2012 |
| WO | WO-2012103151 A2 | 8/2012 |

OTHER PUBLICATIONS

"International Application Serial No. PCT/US2012/022439, International Preliminary Report on Patentability mailed Aug. 8, 2013", 6 pgs.

"International Application Serial No. PCT/US2012/022439, Search Report mailed Sep. 10, 2012", 3 pgs.

"International Application Serial No. PCT/US2012/022439, Written Opinion mailed Sep. 10, 2012", 4 pgs.

Vassilios, Karakoidas, et al., "FIRE/J Optimizing Regular Expression Searches With Generative Programming", Software Practice & Experience, Wiley & Sons, vol. 38, No. 6, (Jul. 23, 2007), 557-573.

Yang, Jeehong, et al., "An Approach to Graph and Netlist Compression", Data Compression Conference, [Online]. Retrieved from the Internet: <URL: http://comparch.doc.ic.ac.uk/publications/files/Jeehong08Dcc08.pdf>, (2008), 33-42.

"Chinese Application Serial No. 201180034987.3 Response filed Jun. 9, 2015 to Office Action mailed Mar. 25, 2015", With the English claims, 14 pgs.

"Chinese Application Serial No. 201180034987.3, Office Action mailed Mar. 25, 2015", W/ English Tranlations, 17 pgs.

"Chinese Application Serial No. 201280013925.9, Office Action mailed May 18, 2015", W/ English Translation, 4 pgs.

"Chinese Application Serial No. 201280013925.9, Response filed Jul. 28, 2015 to Office Action mailed May 18, 2015", W/ English Claims, 13 pgs.

"European Application Serial No. 11793185.7, Extended European Search Report mailed Jul. 6, 2015", 7 pgs.

"Japanese Application Serial No. 2013-550670 Response filed Jun. 11, 2015 to Office Action mailed Mar. 17, 2015", W/ English claims, 30 pgs.

(56) References Cited

OTHER PUBLICATIONS

"Japanese Application Serial No. 2013-550670, Preliminary Amendment filed Jan. 22, 2015", W/ English Claims.
"Korean Application Serial No. 10-2013-7021925, Amendment filed Jun. 12, 2015", W/ English claims, 38 pgs.
"Korean Application Serial No. 10-2013-7022037, Amendment filed Jun. 11, 2015", W/ English claims.
"Korean Application Serial No. 10-2013-7022299, Amendment filed Jun. 12, 2015", W/ English claims, 36 pgs.
"Korean Application Serial No. 10-2013-7022309, Amendment filed Jun. 11, 2015", W/ English claims.
"Taiwanese Application Serial No. 100120418, Decision of Rejection mailed May 20, 2015", W/ English Translation, 12 pgs.
"Taiwanese Application Serial No. 101102912, Office Action mailed Mar. 27, 2015", W/ English Translation, 6 pgs.
"Taiwanese Application Serial No. 101102956, Office Action mailed Jun. 23, 2015", W/ English Search Report, 5 pgs.
"Taiwanese Application Serial No. 101102988 Response filed Jul. 13, 2015 to Office Action mailed Apr. 9, 2015", With the English claims, 21 pgs.
"Taiwanese Application Serial No. 101102988, Office Action mailed Apr. 7, 2015", W/ English Translation, 8 pgs.
"Taiwanese Application Serial No. 101102989, Office Action mailed May 27, 2015", W/ English Translation, 7 pgs.
Bishop, Christopher, "The Multi-Layer Perceptron In: Neural Networks for Pattern Recognition", Oxford University Press, (Dec. 31, 1995), 116-160.
Neveu, J N P, et al., "Implementation of the neocognitron on a SIMD architecture", Intelligent Information Systems, (Nov. 29, 1994), 179-183.
Vasconcelos, G C, et al., "Efficient Detection of Spurious Inputs for Improving the Robustness of MLP Networks in Practical Applications", Neural Computing and Applications, Springer-Verlag LO, vol. 3, No. 4, (Jan. 1, 1995), 202-212.
"Chinese Application Serial No. 10756723.2, Amendment filed Aug. 22, 2013", w/English Claims, 18 pgs.
"Chinese Application Serial No. 201180034987.3, Office Action mailed Mar. 4, 2014", w/English Translation, 21 pgs.
"Chinese Application Serial No. 201180034987.3, Office Action mailed Oct. 8, 2014", W/ English Translation, 18 pgs.
"Chinese Application Serial No. 201180034987.3, Response filed Jul. 17, 2014 to Office Action mailed Mar. 4, 2014", W/ English Claims, 4 pgs.
"Chinese Application Serial No. 201280012402.2, Amendment filed Jan. 16, 2014", W/ English Claims, 18 pgs.
"Chinese Application Serial No. 201280013903.2, Voluntary Amendment filed May 8, 2014", W/ English Translation, 27 pgs.
"Chinese Application Serial No. 201280013925.9 Response Filed Oct. 23, 2014 to Non-Final Office Action Mailed Sep. 23, 2014", With the English claims, 19 pgs.
"Chinese Application Serial No. 201280013925.9, Amendment filed Jan. 26, 2014", w/English Claims, 13 pgs.
"Chinese Application Serial No. 201280013925.9, Office Action mailed Mar. 3, 2014", w/English Translation, 10 pgs.
"Chinese Application Serial No. 201280013925.9, Office Action mailed Aug. 8, 2014", W/ English Translation, 13 pgs.
"Chinese Application Serial No. 201280013925.9, Response filed Jul. 16, 2014 to Office Action mailed Mar. 3, 2014", W/ English Claims, 14 pgs.
"European Application Serial No. 11793185.7, Amendment field Sep. 3, 2013", 7 pgs.
"European Application Serial No. 12739387.4, Office Action mailed Sep. 13, 2013", 2 pgs.
"European Application Serial No. 12739387.4, Response filed Mar. 21, 2014 to Office Action mailed Sep. 13, 2013", 12 pgs.
"European Application Serial No. 12739387.4, Response filed Nov. 27, 2014 to Extended European Search Report mailed May 27, 2014", 11 pgs.
"European Application Serial No. 12739626.5, Extended European Search Report mailed Jun. 18, 2014", 7 pgs.
"European Application Serial No. 12739626.5, Office Action mailed Sep. 17, 2013", (Sep. 17, 2013), 2 pgs.
"European Application Serial No. 12739626.5, Response filed Mar. 21, 2014 to Office Action mailed Sep. 17, 2013", 10 pgs.
"European Application Serial No. 12739626.5, Response filed Dec. 11, 2014 to European Extended Search Report mailed Jun. 18, 2014", 11 pgs.
"European Application Serial No. 12739650.5, Office Action mailed Sep. 13, 2013", 2 pgs.
"European Application Serial No. 12739650.5, Response filed Mar. 21, 2014 to Office Action mailed Sep. 13, 2013", 12 pgs.
"European Application Serial No. 12739652.1, Office Action mailed Sep. 13, 2013", 2 pgs.
"European Application Serial No. 12739652.1, Response filed Mar. 21, 2014 to Office Action mailed Sep. 13, 2013", 8 pgs.
"International Application Serial No. PCT/US2011/039849, International Preliminary Report on Patentability mailed Dec. 20, 2012", 6 pgs.
"International Application Serial No. PCT/US2011/039849, International Search Report mailed Feb. 9, 2012", 3 pgs.
"International Application Serial No. PCT/US2011/039849, Written Opinion mailed Feb. 9, 2012", 4 pgs.
"International Application Serial No. PCT/US2012/022435, International Preliminary Report on Patentability mailed Aug. 8, 2013", 8 pgs.
"International Application Serial No. PCT/US2012/022435, Search Report mailed Aug. 31, 2012", 3 pgs.
"International Application Serial No. PCT/US2012/022435, Written Opinion mailed Aug. 31, 2012", 6 pgs.
"International Application Serial No. PCT/US2012/022441, International Preliminary Report on Patentability mailed Aug. 8, 2013", 6 pgs.
"International Application Serial No. PCT/US2012/022441, Search Report mailed Aug. 31, 2012", 3 pgs.
"International Application Serial No. PCT/US2012/022441, Written Opinion mailed Aug. 31 , 2012", 4 pgs.
"International Application Serial No. PCT/US2012/022441, Written Opinion mailed Aug. 31, 2012", 3 pgs.
"International Application Serial No. PCT/US2012/022444, International Preliminary Report on Patentability mailed Aug. 8, 2013", 5 pgs.
"International Application Serial No. PCT/US2012/022444, Search Report mailed Aug. 31, 2012", 3 pgs.
"Japanese Application Serial No. 2013-514372 Response Filed Nov. 4, 2014 to Non-Final Office Action mailed Aug. 5, 2014", With the English claims, 19 pgs.
"Japanese Application Serial No. 2013-514372, Office Action mailed Aug. 5, 2014", W/ English Translation, 12 pgs.
"Taiwan Application Serial No. 100120418 Response Filed Nov. 11, 2014 to Non-Final Office Action Mailed Aug. 11, 2014", With the English claims, 46 pgs.
"Taiwanese Application Serial No. 100120418, Office Action mailed Aug. 11, 2014", W/ English Translation, 6 pgs.
Badii, Atta, et al., "Efficient FPGA-based regular expression pattern matching", European and Mediterranean Conference on Information Systems A1 Bustan Rotana Hotel, [Online]. Retrieved from the Internet: <http://www.researchgate.net/publication/228810333_Efficient_FPGA_based_regular_expression_pattern_matching/file/9fcfd50e5e78229189.pdf>, (Mar. 25, 2008), 1-12.
Li, Lin, "On Algebraic Properties of State Machines", Master's Thesis—Guangxi Normal University, (Jan. 1, 2007), 31-34.
Mitra, Abhishek, et al., "Compiling PCRE to FPGA for Accelerating SNORT IDS", ACM/IEEE Symposium on Architectures for Networking and Communications Systems, (Dec. 2007), 9 pgs.
Sidhu, Reetinder, et al., "Fast Regular Expression Matching using FPGAs", IEEE on Field Programmable Custom Computing Machines (FCCM 2001), (Apr. 2001), 227-238.
Vasiliadis, Giorgos, et al., "Regular Expression Matching on Graphics Hardware for Intrusion Detection", Proceedings of the 12th International Symposium on Recent Advances in Intrusion Detection, See pp. 267-270, 272-274, (2009), 265-283.

(56) References Cited

OTHER PUBLICATIONS

Yang, Yi-Hua E, et al., "Compact Architecture for High-Throughput regular expression matching on FPGA", Architectures for Networking and Communications Systems; Nov. 6, 2008-Nov. 7, 2008, (Nov. 6, 2008), 30-39.
Zhang, C, et al., "Intrusion Detection Using Hierarchical Neural Networks", Pattern Recognition Letters, 26(6), (May 1, 2005), 779-791.
"AdaBoost Parallelization on PC Clusters with Virtual Shared Memory for Fast Feature Selection", IEEE International Conference on Signal Processing and Communications, (Nov. 2007), 165-168.
"Chinese Application Serial No. 201180034987.3 Response filed Dec. 19, 2014 to Non-Final Office Action mailed Oct. 8, 2014", W/ English claims, 21 pgs.
"Chinese Application Serial No. 201280013925.9 Response filed Mar. 6, 2015 to Office Action mailed Dec. 22, 2014", W/ English Claims, 3 pgs.
"Chinese Application Serial No. 201280013925.9, Office Action mailed Dec. 22, 2014", W/ English Translation, 4 pgs.
"Japanese Application Serial No. , 2013-550670 Office Action mailed Mar. 17, 2015", W/ English Translation, 6 pgs.
"Japanese Application Serial No. 2013-514372 Response filed Mar. 5, 2015 to Office Action mailed Aug. 5, 2014", With the English claims, 17 pgs.
"Japanese Application Serial No. 2013-514372, Response filed Mar. 5, 2015 to Final Office Action mailed Dec. 9, 2014", W/ English Claims, 17 pgs.
"Japanese Application Serial No. 2013-550669, Notice of Rejection mailed Mar. 17, 2015", with English Translation, 7 pgs.
"Japanese ApplicationSerial No. 2013-550671, Amendment filed Jan. 22, 2015", W/ English Claims, 7 pgs.
"Japanese Application Serial No. 2013-550671, Notice of Rejection mailed Mar. 24, 2015", With English Translation, 7 pgs.
"Japanese Application Serial No. 2013-550672, Preliminary Amendment filed on Jan. 22, 2015", W/ English Claims, 17 pgs.
"Taiwan Application Serial No. 100120418 Response filed Apr. 10, 2015 to Office Action mailed Feb. 5, 2015", W/ English Claims, 5 pgs.
"Taiwanese Application Serial No. 100120418, Office Action mailed Jan. 12, 2015", W/ English Translation, 28 pgs.
Polikar, R, "Ensemble Based Systems in Decision Making", IEEE Circuits and Systems Magazine, vol. 6, No. 3, (2006), 21-45.
Shinya, Ryoma, et al., "Implementation of Regular Expression Engine with Dynamic Code Generation", (Jan. 2011), 173-180.
Shinya, Ryoma, et al., "Implementation of Regular Expression Engine with Dynamic Code Generation.", Information Processing Society 52nd Programming Symposium, W/ Machine Translation, 22 pgs.
U.S. Appl. No. 12/943,551, Nov. 10, 2010, Analyzing Data Using a Hierarchical Structure.
U.S. Appl. No. 13/357,511, Jan. 24, 2012, State Grouping for Element Utilization.
U.S. Appl. No. 14/087,904, Nov. 22, 2013, Analyzing Data Using a Hierarchical Structure.
U.S. Appl. No. 13/357,472, filed Jan. 24, 2012, Method and Apparatus for Compiling Regular Expressions.
U.S. Appl. No. 14/252,542, filed Apr. 14, 2014, Method and Apparatus for Compiling Regular Expressions.
U.S. Appl. No. 13/357,496, filed Jan. 24, 2012, Utilizing Special Purpose Elements to Implement a FSM.
U.S. Appl. No. 13/357,505, filed Jan. 24, 2012, Unrolling Quantifications to Control In-Degree and/or Out-Degree of Automation.
U.S. Appl. No. 14/252,600, filed Apr. 14, 2014, Unrolling Quantifications to Control In-Degree and/or Out-Degree of Automation.
U.S. Appl. No. 14/335,537, filed Jul. 18, 2014, State Grouping for Element Utilization.
Chinese Application U.S. Appl. No. 201180034987.3, Office Action mailed Sep. 6, 2015, W/ English Translation, 6 pgs.
European Application Serial No. 12739652.1, Extended European Search Report mailed Oct. 15, 2015, 11 pgs.
Korean Application Serial No. 10-2013-7022037, Notice of Preliminary Rejection mailed Aug. 28, 2015, W/ English Translation, 6 pgs.
Korean Application Serial No. 10-2013-7022299, Notice of Preliminary Rejection mailed Aug. 21, 2015, W/ English Translation, 7 pgs.
Korean Application Serial No. 10-2013-7022309, Office Action mailed Oct. 2, 2015, W/ English Translation, 6 pgs.
Davide, Pasetto, et al., "DotStar: breaking the scalability and performance barriers in parsing regular expressions", Computer Science—Research and Development; Computer Science—Research and Development Organ Der Fachbereiche Softwaretechnik, Datenbanken Und lnformationssysteme Der Gesellschaft F Prg A [1/4]R Informatik E.V. (GI), Springer-Verlag, Berlin/Heidelb, Voi, (Apr. 2, 2010), 93-104.
Le, Hoang Long, et al., "Enhanced FPGA-based architecture for regular expression matching in NIDS", Electrical Engineering/Electronics Computer Telecommunications and Information Technology (ECTI-CON), 2010 International Conference on, IEEE, Piscataway, NJ, USA, (May 19, 2010), 666-670.
Michela, Becchi, et al., "Extending finite automata to efficiently match Perl-compatible regular expressions", Proceedings of the 2008 ACM Conext Conference on, Conext '08 New York, New York, Usa, (Jan. 1, 2008), 1-12.
Chinese Application Serial No. 201180034987.3, Response filed Nov. 23, 2015 to Office Action mailed Sep. 6, 2015, W/ English Claims, 27 pgs.
European Application Serial No. 11793185.7, Response filed Jan. 5, 2016 to Extended European Search Report mailed Jul. 6, 2015, 18 pgs.
Japanese Application Serial No. 2013-550670 Response filed Oct. 9, 2015 to Office Action mailed Jul. 21, 2015, w/English claims, 22 pgs.
Japanese Application Serial No. 2013-550671, Office Action mailed Jul. 21, 2015, 3 pgs.
Japanese Application Serial No. 2013-550671, Response filed Oct. 16, 2015 to Office Action mailed Jul. 21, 2015, W/ English Claims, 13 pgs.
Korean Application Serial No. 10-2013-7022037, Response filed Oct. 27, 2015 to Notice of Preliminary Rejection mailed Aug. 28, 2015, W/ English Claims, 27 pgs.
Korean Application Serial No. 10-2013-7022299, Response filed Oct. 13, 2015 to Office Action mailed Aug. 21, 2015, W/ English Claims, 21 pgs.
Korean Application Serial No. 10-2013-7022309, Response filed Dec. 1, 2015 to Office Action mailed Oct. 2, 2015, W/ English Claims, 21 pgs.
Taiwanese Application Serial No. 100120418, Response filed Nov. 25, 2015 to Decision of Rejection mailed May 20, 2015, W/ English Claims, 44 pgs.
Taiwanese Application Serial No. 101102956, Response filed Sep. 23, 2015 to Office Action mailed Jun. 23, 2015, W/ English Translation, 75 pgs.
Taiwanese Application Serial No. 101102989, Response filed Aug. 26, 2015 to Office Action mailed May 25, 2015, W/ English Claims, 14 pgs.

\* cited by examiner abb?(b|c){1, 2}

SS(abb?(b|c){1, 2})

UTILIZING SPECIAL PURPOSE ELEMENTS TO IMPLEMENT A FSM

CLAIM OF PRIORITY

This patent application is a continuation of U.S. application Ser. No. 13/357,496, filed Jan. 24, 2012, now issued as U.S. Pat. No. 8,843,911, which claims the benefit of priority, under 35 U.S.C. Section 119(e), to U.S. Provisional Patent Application Ser. No. 61/436,022, filed on Jan. 25, 2011, all which are hereby incorporated by reference herein in their entirety.

BACKGROUND

A finite state machine (FSM) (also referred to as a finite-state automaton, automaton, or simply a state machine) is a representation of states, transitions between states and actions. A finite state machine can be used to design digital logic, computer programs, or images for a parallel machine. A finite state machine is a model of behavior composed of a finite number of states, transitions between those states, and outputs. A finite state machine can be represented as a graph where vertices of the graph correspond to states of the FSM and edges of the graph correspond to transitions between the states which occur due to one or more inputs to the finite state machine. Finite state machines can also have probabilistic transitions, fuzzy states, or other oddities. A finite state machine can function as a finite internal memory having an input feature and an optional output feature. Finite state machines having an output can be referred to as finite state transducers.

Applications of finite state machines include electronic design automation, communication protocol design, biology and artificial intelligence research, and linguistics to describe the grammars of natural languages.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

This document describes, among other things, a compiler that converts source code into a machine code implementation of a finite state machine. The machine code can correspond to a target device, in that the machine code is configured to implement the functions described by the source code on the target device. In an example, the target device is a parallel machine and the machine code comprises an image for the parallel machine. In another example, the target device comprises a computer having a Von Neumann architecture, and the machine code comprises instructions for execution by a processor in the computer.

In any case, the compiler can compile the source code into machine code that implements a finite state machine embodying the functions described by the source code. In the process of compiling the source code, the compiler converts the source code into an automaton. Using the automaton, the compiler can identify and combine redundancies in the source code in order to optimize the resultant finite state machine implemented by the machine code. Additionally, the compiler can identify and map portions of the automaton to elements corresponding to the target device. When the target device is a parallel machine, the elements can comprise hardware elements of the parallel machine. When the target device is a computer having a Von Nuemann architecture, the elements can comprise instructions for execution by a processor. During the mapping, certain portions of the finite state machine can be mapped to specific (e.g., special purpose) elements in order to, for example, improve the performance of the resultant machine code.

Figure 1:
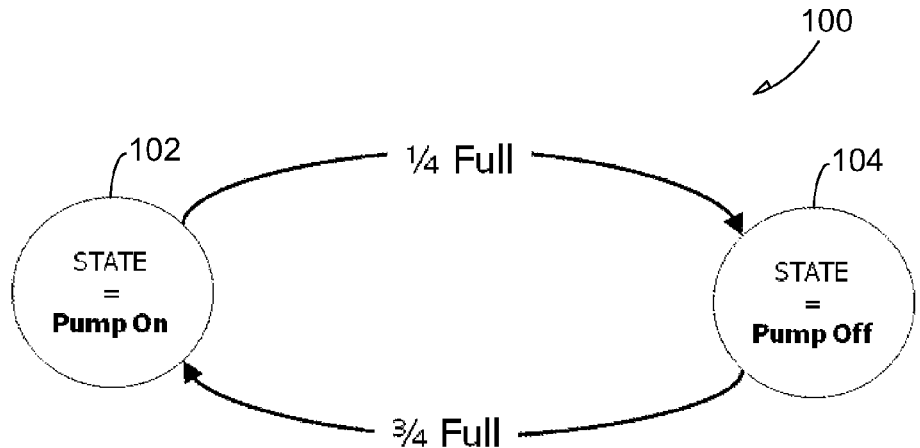
FIG. 1 illustrates an example of a deterministic finite state machine, according to various embodiments of the invention.

FIG. 1 illustrates an example finite state machine (FSM) 100. The finite state machine 100 corresponds to a method for maintaining a water level in a container between ¼ and ¾ full. At state 102, the pump is activated to reduce the water level in the container. When the water level drops below ¼ full, the FSM 100 transitions to state 104 where the pump is deactivated. While at state 104, when the water level exceeds ¾ full, the FSM 100 transitions back to state 104 where the pump is reactivated. The input to the FSM 100 is the water level in the container and the output is the pump ON/OFF signal.

FSMs can be divided into two classes; deterministic and non-deterministic. A deterministic FSM has a single path of execution at a given time, while a non-deterministic FSM has multiple concurrent paths of execution. A non-deterministic FSM with N states can typically be converted into a deterministic FSM with worst case 2 to the N states. This exponential state expansion from non-deterministic to deterministic FSM, however, often makes the non-deterministic FSM the most practical implementation with finite machine resources and time.

Figure 2:
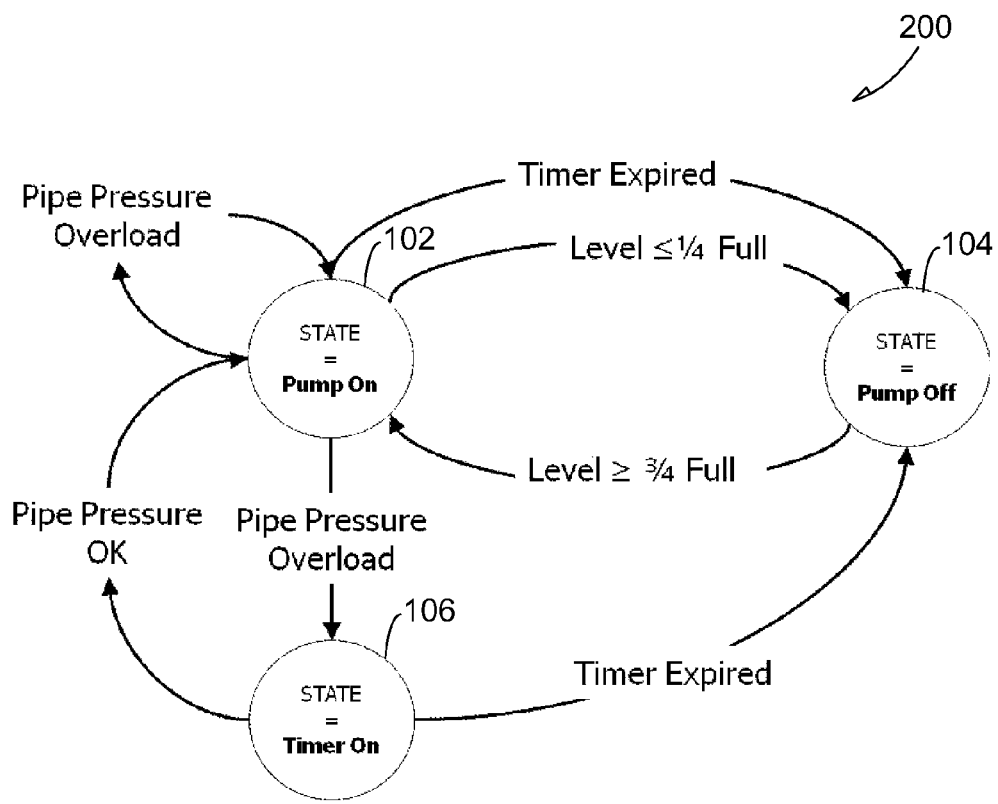
FIG. 2 illustrates an example of a non-deterministic finite state machine, according to various embodiments of the invention.

The FSM 100 is an example of a deterministic FSM, and this deterministic FSM 100 may be a part of a larger non-deterministic FSM. For example, FIG. 2 illustrates a non-deterministic FSM 200 of which the deterministic FSM 100 makes up a portion. The FSM 200 adds monitoring of a pipe pressure to the water level maintaining FSM 100. In FSM 200, the pipe pressure is monitored while the pump is running, and the pump is stopped if the pipe pressure is overloaded for a fixed period of time. In the FSM 200, when the pipe pressure is overloaded while the pump is activated at state 102, the FSM 200 transitions to state 106 where a timer is started. Additionally, when the pipe is overloaded, state 102 transitions to itself to maintain the pump in the ON state. Accordingly, at this position in the FSM 200, both state 102, the "Pump ON" state, and state 106, the "Timer ON", state are active concurrently. Since states 102 and 106 can be active concurrently, multiple paths of execution are present, and the FSM 200 is accordingly non-deterministic. From state 106, the FSM 200 transitions to state 102 when the pressure in the pipe is no longer overloaded. Also, the FSM 200 transitions from both state 102 and state 106 to state 104 to set the pump in the OFF state when the timer expires.

Figure 3:
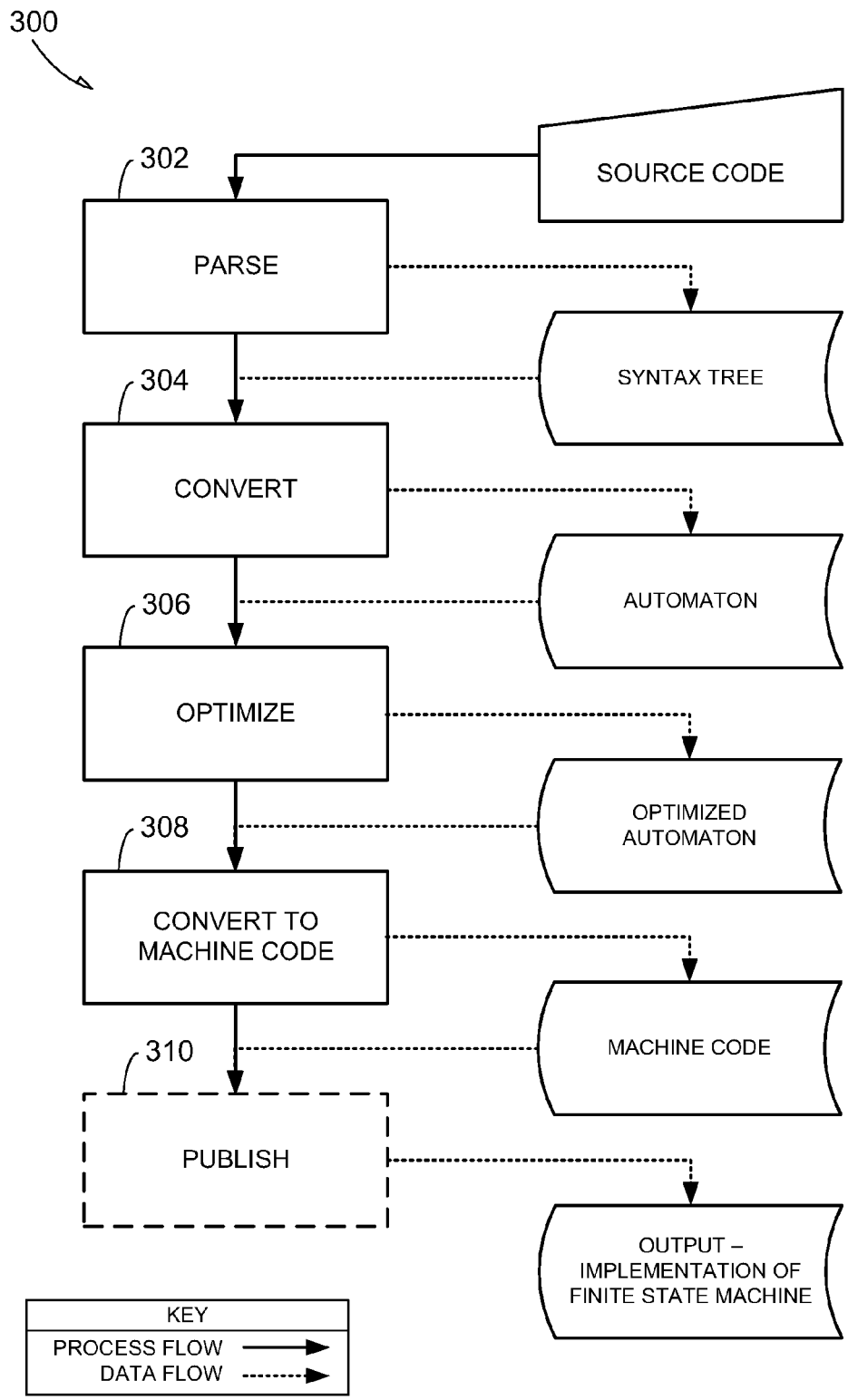
FIG. 3 illustrates an example of a method for a compiler to convert source code into machine code, according to various embodiments of the invention.

FIG. 3 illustrates a flow chart 300 for an example compiler. The compiler takes source code as an input and generates machine code to implement the functions described by the source code on a target device. In one example, the target device comprises a parallel machine as described below with respect to FIGS. 5-9. The parallel machine includes a plurality of programmable elements that can be set into one of a plurality of states. Machine code for a parallel machine comprises an image for setting the state of one or more of the programmable elements. In another example, the target device is a computer having a Von Nuemann architecture. The computer includes one or more processors coupled to one or more memory devices having software thereon for execution by the one or more processors. Machine code for a Von Nuemann architecture comprises instructions for execution by the one or more processors. An example computer having a Von Nuemann architecture is described below with respect to FIG. 15. In any case, the compiler generates machine code by using an automaton as an intermediary conversion. The compiler uses an automaton in order to, among other things, optimize the resultant FSM and, in turn, optimize the machine code.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include search criteria for the search of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

Referring back to FIG. 3, at block 302 the compiler can parse the source code to form an arrangement of relationally connected operators. Parsing source code can create a generic representation of the source code. In an example, the generic representation comprises an encoded representation of the regexes in the source code in the form of a tree graph known as a syntax tree. The examples described herein refer to the arrangement as a syntax tree (also known as an "abstract syntax tree") in other examples, however, a concrete syntax tree or other arrangement can be used.

Since, as mentioned above, the compiler can support multiple languages of source code, parsing converts the source code, regardless of the language, into a non-language specific representation, e.g., a syntax tree. Thus, further processing (blocks 304, 306, 308, 310) by the compiler can work from a common input structure regardless of the language of the source code.

The syntax tree includes a plurality of operators that are relationally connected. The syntax tree can include multiple different types of operators, where different types of operators correspond to different functions implemented by the source code. That is, different operators can correspond to different functions implemented by the regexes in the source code.

At block 304, the syntax tree is converted into an automaton. An automaton comprises a software model of a FSM and can accordingly be classified as deterministic or non-deterministic. A deterministic automaton has a single path of execution at a given time, while a non-deterministic automaton has multiple concurrent paths of execution. The automaton comprises a plurality of states. In order to convert the syntax tree into an automaton, the operators and relationships between the operators in the syntax tree are converted into states with transitions between the states.

In an example, the automaton comprises general purpose states and special purpose states. The general purpose states and special purpose states correspond to general purpose elements and special purpose elements supported by a target device for which the compiler is generating machine code. Different types of target devices can support different types of general purpose elements as well as one or more different types of special purpose elements. A general purpose element can typically be used to implement a broad range of functions, while a special purpose element can typically be used to implement a more narrow range of functions. In an example, however, a special purpose element can achieve, for example, greater efficiency within its narrow range of applicability. Accordingly, a special purpose element can be used to, for example, reduce the machine cycles or the machine resources required to implement certain functions in the target device. In some examples, the target device supports solely special purpose elements, wherein multiple different types of special purpose elements are supported.

The type of target device can largely control the type of elements that are supported by the target device. In one example, the target device is a computer having a Von Nuemann architecture, and the elements supported include an instruction set corresponding to a processor of the computer. The instruction set can include general purpose instructions such as add, subtract, read, and write, as well as specialized instructions such as multiple store and movement of large blocks of memory. In another example, the target device is a parallel machine as described below with respect to FIGS. 5-9. The elements supported by the parallel machine include the hardware elements of the parallel machine. The hardware components can include general purpose elements such as state machine elements, as well as special purpose elements such as a counter. In some examples, particularly the parallel machine examples, the target device can support a large number of general purpose elements compared to a relatively small number of special purpose elements. Accordingly, in some examples, most functions will be implemented with the general purpose elements, while fewer selected functions are implemented with the special purpose elements.

In order to utilize the elements of the target device effectively, the compiler converts appropriate portions of the syntax tree using special purpose states in the automaton that correspond to special purpose elements supported by the target device. Portions of the syntax tree not converted using special purpose states can be converted into general purpose states corresponding to general purpose elements supported by the target device. The compiler can analyze the syntax tree to determine which portions can be converted using special purpose states and which portions should be converted into general purpose states. In some examples, most of the automaton is converted into one or more general purpose states, while a smaller percentage is converted using one or more special purpose states.

Converting some portions of the automaton using special purpose states can, for example, reduce the number of states and/or simplify the automaton, and therefore simplify the FSM implemented by the machine code. For example, certain portions of the syntax tree, if converted using general purpose states without any special purpose states, can result in a large number of states. In order to reduce the number of states, these same portions may be converted using one or more special purpose states possibly in combination with one or more general purpose states. A small number of special purpose states may be able to take the place of a large number of general purpose states. Since the number of general purpose states often corresponds to the number of general purpose elements used by the resulting machine code, reducing the number of general purpose states can reduce the complexity and increase the efficiency of the resultant machine code due to fewer general purpose elements used.

In any case, the compiler converts certain portions in the syntax tree into certain types of states and other portions in the syntax tree into other types of states. Since the type of state corresponds to a type of element supported by the target device, the conversion can have the effect of mapping certain functions implemented by the source code to a specific type of element supported by the parallel machine. In examples where the target device is a computer having a Von Nuemann architecture, certain functions in the source code can be mapped to specific types of instructions of the instruction set supported by the Von Nuemann computer. In examples where the target device is a parallel machine, certain functions of the source code can be mapped to general purpose elements, such as state machine elements, and other functions can be mapped to special purpose elements, such as counters. Additional detail regarding converting the syntax tree into an automaton is provided below with respect to FIG. 4.

Once the automaton has been formed, at block 306, the automaton can be optimized to, among other things, reduce its complexity and size. The automaton can be optimized by combining equivalent states, among other things.

At block 308, the automaton is converted into machine code for a target device. Each portion of the automaton is converted into machine code corresponding to the elements of the target device as mapped at block 304. In one example, the machine code comprises executable instructions for a processor in a Von Nuemann architecture. Here, the machine code can comprise an executable program. In another example, the machine code can comprise bits for programming of hardware elements in a parallel machine. Here, the machine code can comprise an image for loading onto the parallel machine.

At block 310, the machine code can be published by the compiler. In an example, the machine code can be published by saving the machine code to a computer readable medium. In another example, the machine code can be published by sending the machine code to another device, such as a programming device for loading the machine code onto a parallel machine. In yet another example, the machine code can be published by loading the machine code onto a parallel machine. In still another example, the machine code can be published by displaying the machine code on a display device.

Figure 15:
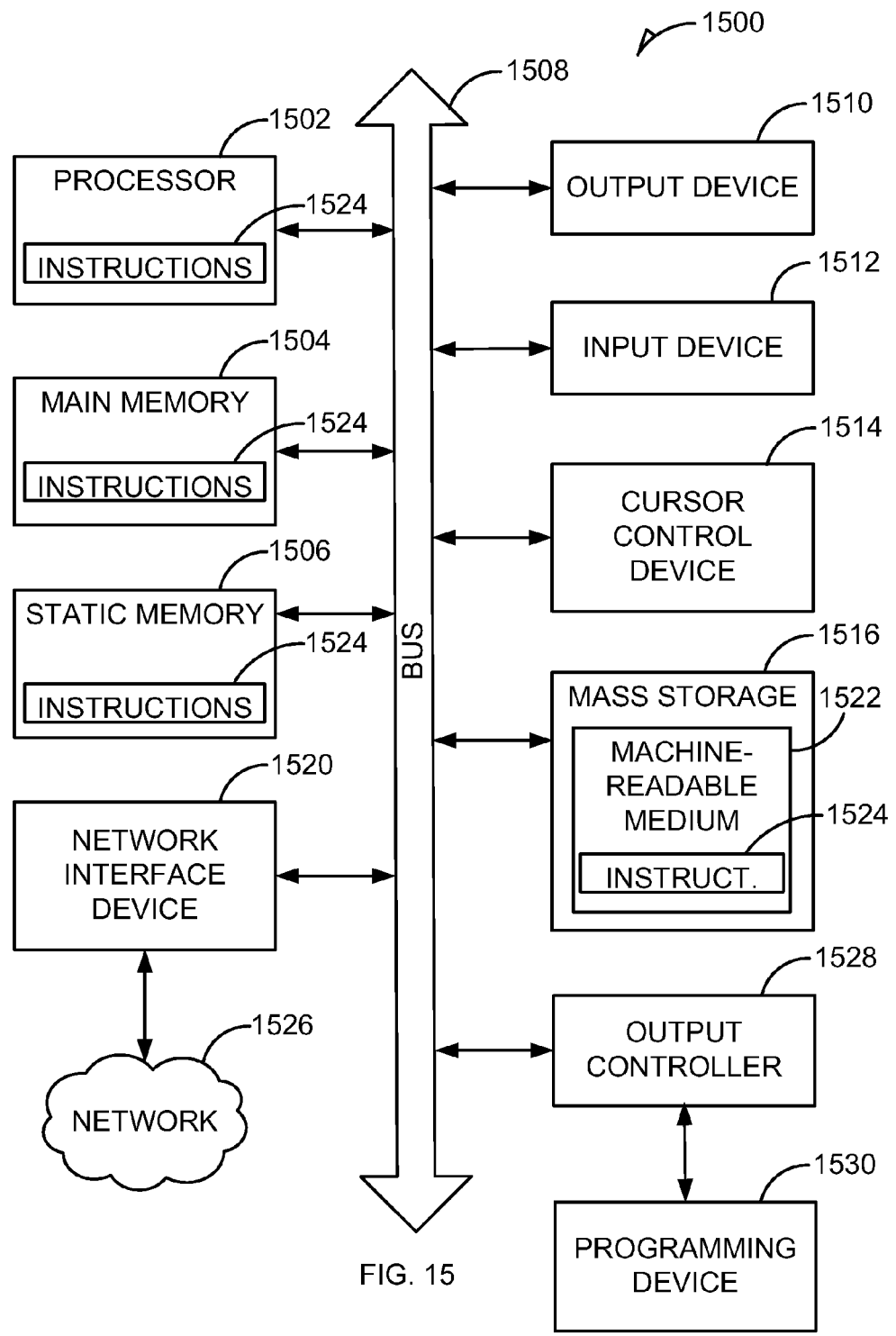
FIG. 15 illustrates an example of a computer having a Von Nuemann architecture, according to various embodiments of the invention.

In an example, the compiler can be implemented by instructions for a computer having a Von Nuemann architecture. These instructions can cause a processor on the computer to implement the functions of the compiler. For example, the instructions, when executed by the processor, can cause the processor to perform actions as described in blocks 302, 304, 306, 308, and 310 on source code that is accessible to the processor. An example computer having a Von Nuemann architecture is shown in FIG. 15 and described below.

Figure 4:
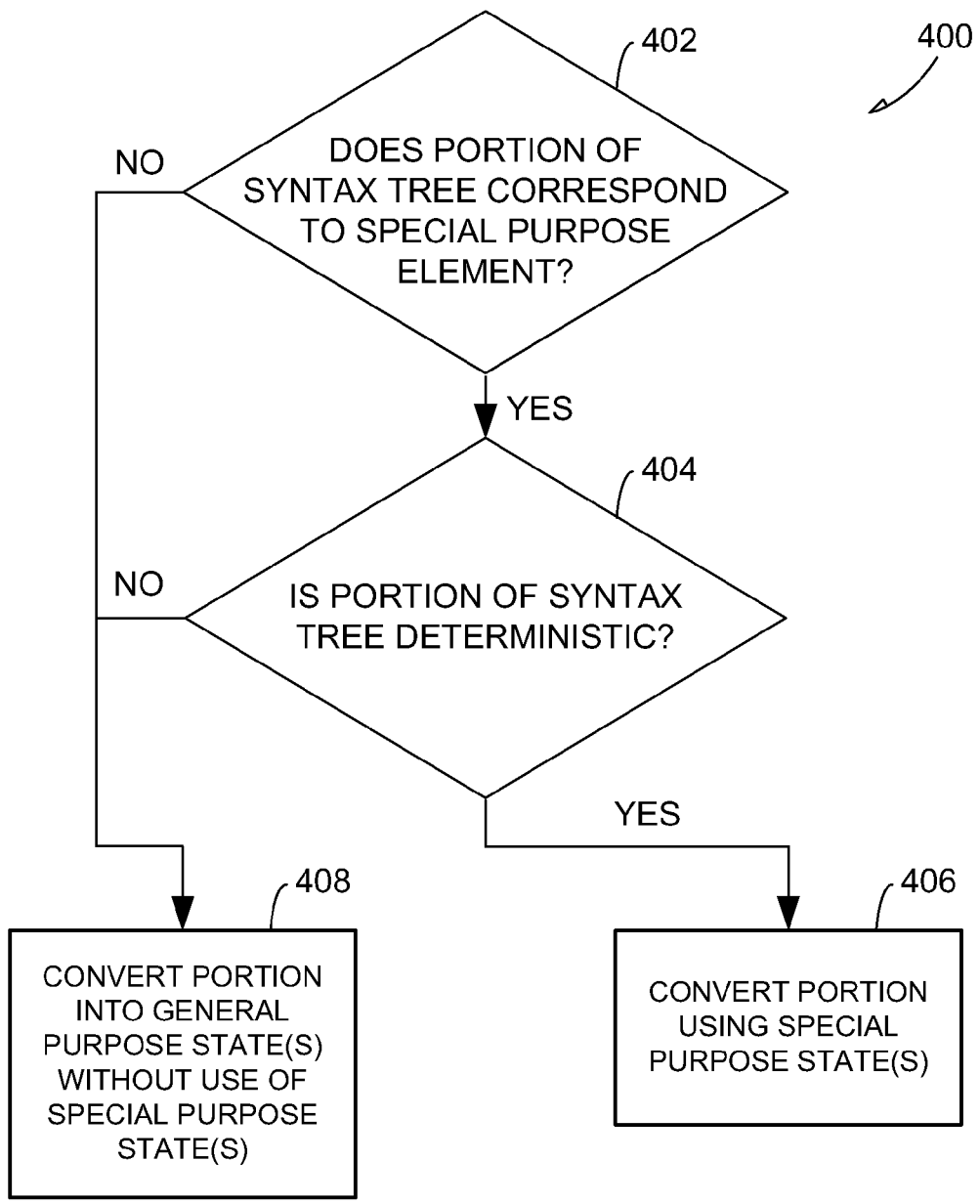
FIG. 4 illustrates a method for converting a syntax tree into an automaton according to various embodiments of the invention.

FIG. 4 illustrates a method 400 for converting an arrangement, such as a syntax tree, into an automaton wherein certain portions of the syntax tree are converted using special purpose states. In order to utilize the special purpose states within the automaton, at block 402, the compiler first identifies portions of the syntax tree that correspond to special purpose elements supported by the target device. For example, in a parallel machine, it is typically possible to implement the entire syntax tree with general purpose states if desired. This is because the general purpose states can be combined in certain ways to implement all the functions supported by the parallel machine. As mentioned above, however, the special purpose elements are intended to implement only certain functions. The compiler, therefore, identifies the operators in the syntax tree that can be implemented, or can be efficiently implemented, by the special purpose elements. These operators and surrounding portions of the syntax tree can then be converted using special purpose states as described below.

In an example, the portions of the syntax tree that correspond to special purpose states are identified based on functions of the operators in the syntax tree. In fact, the functionality of the operators identified by the compiler can correspond to the specific functionality that the special purpose element of the target device is intended to implement. In an example, the compiler can identify quantifications in the syntax tree as corresponding to a special purpose element when the target device supports a counter as a special purpose element. More detail regarding quantifications and counters is provided with respect to FIGS. 5-14.

At block 404, once a portion has been identified as corresponding to a special purpose element, the identified portion may be further analyzed to determine whether it meets certain conditions in order to be mapped to a special purpose element. In an example, the condition includes whether an automaton corresponding to the identified portion is deterministic. That is, the condition corresponds to whether the identified portion if converted into an automaton of general purpose states is deterministic regardless of whether a larger automaton (e.g., an automaton formed based on the entire syntax tree) of which the identified portion is a part is deterministic. If the automaton corresponding to the identified portion is deterministic, then, at block 406, the identified portion is converted using one or more special purpose states. If the automaton is not deterministic, then, at block 408, the identified portion is converted using one or more general purpose states without any special purpose states. In other examples, the automaton can convert the identified portion using a first type of special purpose state when the identified power is deterministic and another type of special purpose state when the identified portion is not deterministic. In still other examples, other conditions can be used to determine what type of states to use when converting the identified portion of the syntax tree.

In an example, in order to determine whether an identified portion of the syntax tree is deterministic at block 404, the compiler can determine whether the identified portions, if converted into an automaton, have only one active state at a given time. This can be determined by, for example, finding out whether there are any interference conditions with the identified portions. For example, where the identified portion is a quantification, the compiler can analyze the automaton to determine whether the automaton meets a "no re-entrance" condition or a "no prefix" condition. Additional detail regarding the no re-entrance and no prefix interference conditions is provided below with respect to FIGS. 10-14.

Using these determinations, each operator in the syntax tree can be converted into one or more states of an automaton. Some operators can be converted as described above by identifying specific functions implemented by the operators and converting those functions, when appropriate, using one or more special purpose states in the automaton. Operators that are not converted using one or more special purpose states can be converted by default into one or more general purpose states. For example, the syntax tree can be analyzed to identify and map all applicable operators to a counter in a parallel machine. Once all applicable operators have been mapped to one or more counters, the remaining operators can be mapped to one or more state machine elements. In other examples, all portions of the syntax tree are mapped by identifying one or more specific elements corresponding to the particular portion.

Example Embodiments

The description below with respect to FIGS. 5-15 pertains to example embodiments of implementing a FSM using special purpose elements in a parallel machine. In an example, the special purpose elements of the parallel machine include counters. The counters are intended to implement quantifications in the source code. The description with reference to FIGS. 5-9 pertains to example parallel machines, and the description with respect to FIGS. 10-14 describes a compiler to generate machine code to program the parallel machine.

Figure 5:
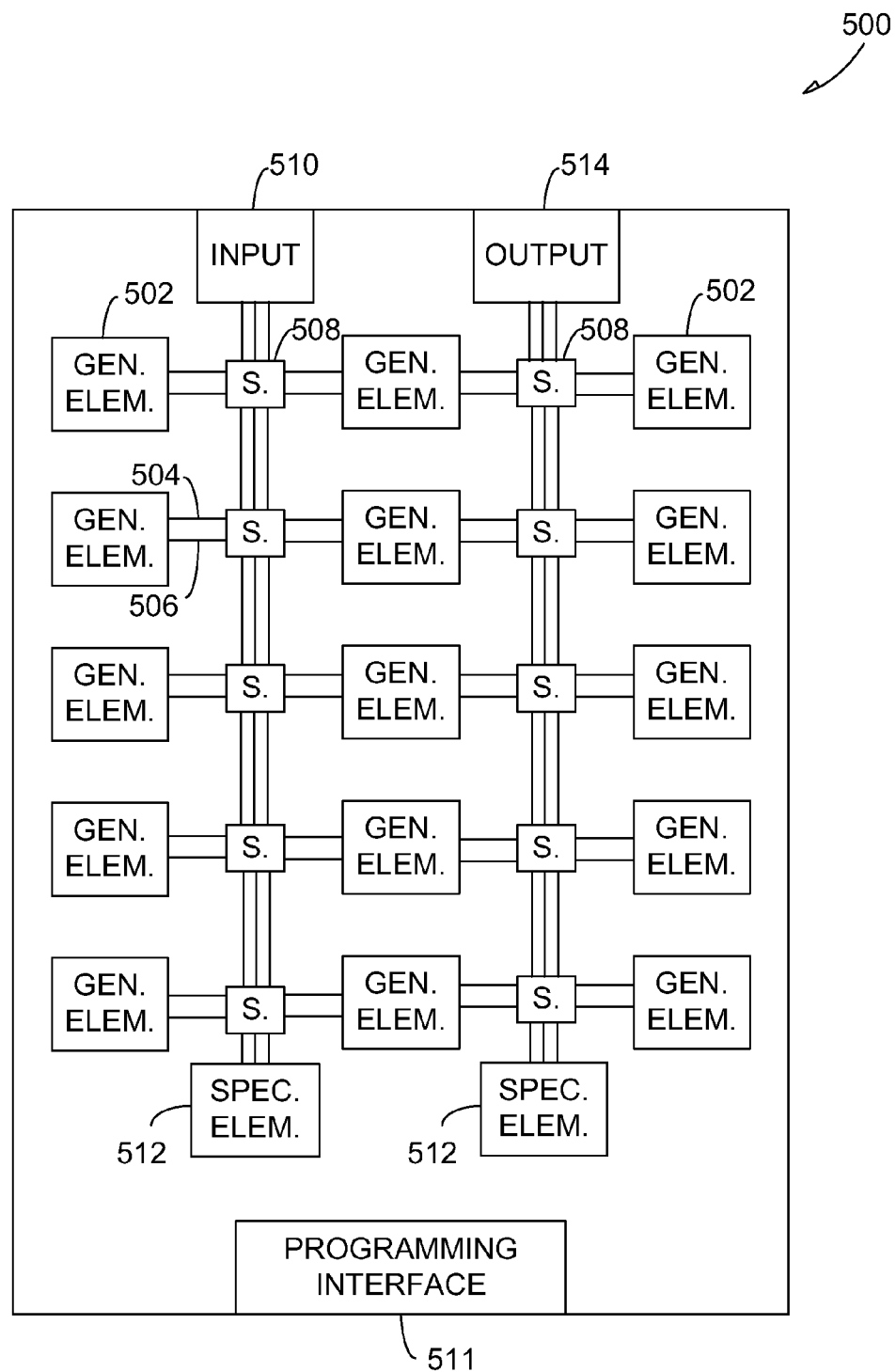
FIG. 5 illustrates an example of a parallel machine, according to various embodiments of the invention.

FIG. 5 illustrates an example parallel machine 500 that can be used to implement a hierarchical structure for analyzing data. The parallel machine 500 can receive input data and provide an output based on the input data. The parallel machine 500 can include a data input port 510 for receiving input data and an output port 514 for providing an output to another device. The data input port 510 provides an interface for data to be input to the parallel machine 500.

The parallel machine 500 includes a plurality of programmable elements including general purpose elements 502 and special purpose elements 512. A general purpose element 502 can include one or more inputs 504 and one or more outputs 506. A general purpose element 502 can be programmed into one of a plurality of states. The state of the general purpose element 502 determines what output(s) the general purpose elements 502 will provide based on a given input(s). That is, the state of the general purpose element 502 determines how the programmable element will react based on a given input. Data input to the data input port 510 can be provided to the plurality of general purpose elements 502 to cause the general purpose elements 502 to take action thereon. Examples of a general purpose element 502 can include a state machine element (SME) discussed in detail below, and a configurable logic block. In an example, a SME can be set in a given state to provide a certain output (e.g., a high or "1" signal) when a given input is received at the data input port 510. When an input other than the given input is received at the data input port 510, the SME can provide a different output (e.g., a low or "0" signal). In an example, a configurable logic block can be set to perform a Boolean logic function (e.g., AND, OR, NOR, ext.) based on input received at the data input port 510.

The parallel machine 500 can also include a programming interface 511 for loading a program (e.g., an image) onto the parallel machine 500. The image can program (e.g., set) the state of the general purpose elements 502. That is, the image can configure the general purpose elements 502 to react in a certain way to a given input. For example, a general purpose element 502 can be set to output a high signal when the character 'a' is received at the data input port 510. In some examples, the parallel machine 500 can use a clock signal for controlling the timing of operation of the general purpose elements 502. In certain examples, the parallel machine 500 can include special purpose elements 512 (e.g., RAM, logic gates, counters, look-up tables, etc.) for interacting with the general purpose elements 502, and for performing special purpose functions. In some embodiments, the data received at the data input port 510 can include a fixed set of data received over time or all at once, or a stream of data received over time. The data may be received from, or generated by, any source, such as databases, sensors, networks, etc, coupled to the parallel machine 500.

Figure 8:
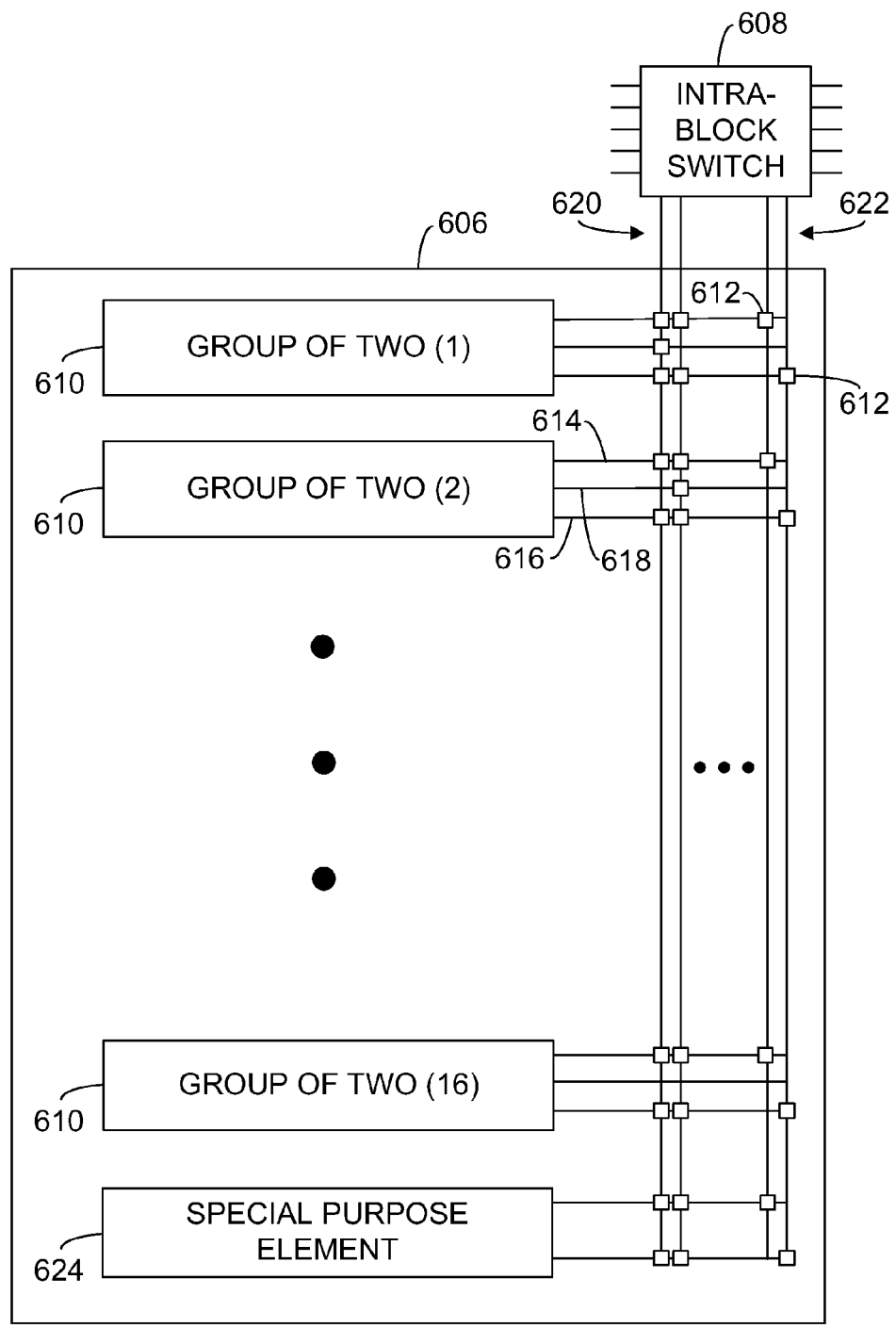
FIG. 8 illustrates an example of a row of the block of FIG. 7, according to various embodiments of the invention.

The parallel machine 500 also includes a plurality of programmable switches 508 for selectively coupling together different elements (e.g., general purpose element 502, data input port 510, output port 514, programming interface 511, and special purpose elements 512) of the parallel machine 500. Accordingly, the parallel machine 500 comprises a programmable matrix formed among the elements. In an example, a programmable switch 508 can selectively couple two or more elements to one another such that an input 504 of a general purpose element 502, the data input port 510, a programming interface 511, or special purpose element 512 can be coupled through one or more programmable switches 508 to an output 506 of a general purpose element 502, the output port 514, a programming interface 511, or special purpose element 512. Thus, the routing of signals between the elements can be controlled by setting the programmable switches 508. Although FIG. 5 illustrates a certain number of conductors (e.g., wires) between a given element and a programmable switch 508, it should be understood that in other examples, a different number of conductors can be used. Also, although FIG. 5 illustrates each general purpose element 502 individually coupled to a programmable switch 508, in other examples, multiple general purpose elements 502 can be coupled as a group (e.g., a block 802, as illustrated in FIG. 8) to a programmable switch 508. In an example, the data input port 510, the data output port 514, and/or the programming interface 511 can be implemented as registers such that writing to the registers provides data to or from the respective elements.

In an example, a single parallel machine 500 is implemented on a physical device, however, in other examples two or more parallel machines 500 can be implemented on a single physical device (e.g., physical chip). In an example, each of multiple parallel machines 500 can include a distinct data input port 510, a distinct output port 514, a distinct programming interface 511, and a distinct set of general purpose elements 502. Moreover, each set of general purpose elements 502 can react (e.g., output a high or low signal) to data at their corresponding input data port 510. For example, a first set of general purpose elements 502 corresponding to a first parallel machine 500 can react to the data at a first data input port 510 corresponding to the first parallel machine 500. A second set of general purpose elements 502 corresponding to a second parallel machine 500 can react to a second data input port 510 corresponding to the second parallel machine 500. Accordingly, each parallel machine 500 includes a set of general purpose elements 502, wherein different sets of general purpose elements 502 can react to different input data. Similarly, each parallel machine 500, and each corresponding set of general purpose elements 502 can provide a distinct output. In some examples, an output port 514 from first parallel machine 500 can be coupled to an input port 510 of a second parallel machine 500, such that input data for the second parallel machine 500 can include the output data from the first parallel machine 500.

In an example, an image for loading onto the parallel machine 100 comprises a plurality of bits of information for setting the state of the programmable elements 102, programming the programmable switches 108, and configuring the special purpose elements 112 within the parallel machine 100. In an example, the image can be loaded onto the parallel machine 100 to program the parallel machine 100 to provide a desired output based on certain inputs. The output port 114 can provide outputs from the parallel machine 100 based on the reaction of the programmable elements 102 to data at the data input port 110. An output from the output port 114 can include a single bit indicating a match of a given pattern, a word comprising a plurality of bits indicating matches and non-matches to a plurality of patterns, a word comprising a plurality of bits indicating a plurality of active and inactive states, and a state vector corresponding to the state of all or certain programmable elements 102 at a given moment.

Example uses for the parallel machine 500 include, pattern-recognition (e.g., speech recognition, image recognition, etc.) signal processing, imaging, computer vision, cryptography, and others. In certain examples, the parallel machine 500 can comprise a finite state machine (FSM) engine, a field programmable gate array (FPGA), and variations thereof. Moreover, the parallel machine 500 may be a component in a larger device such as a computer, pager, cellular phone, personal organizer, portable audio player, network device (e.g., router, firewall, switch, or any combination thereof), control circuit, camera, etc.

FIGS. 6-9 illustrate an example of a parallel machine referred to herein as "FSM engine 600". In an example, the FSM engine 600 comprises a hardware implementation of a finite state machine. Accordingly, the FSM engine 600 implements a plurality of selectively coupleable hardware elements (e.g., programmable elements) that correspond to a plurality of states in a FSM. Similar to a state in a FSM, a hardware element can analyze an input stream and activate a downstream hardware element based on the input stream.

The FSM engine 600 includes a plurality of programmable elements including general purpose elements and special purpose elements. The general purpose elements can be programmed to implement many different functions. These general purpose elements include SMEs 604, 605 (shown in FIG. 9) that are hierarchically organized into rows 606 (shown in FIGS. 7 and 8) and blocks 602 (shown in FIGS. 6 and 7). To route signals between the hierarchically organized SMEs 604, 605, a hierarchy of programmable switches is used including inter-block switches 603 (shown in FIGS. 6 and 7), intra-block switches 608 (shown in FIGS. 7 and 8) and intra-row switches 612 (shown in FIG. 8). A SME 604, 605 can correspond to a state of a FSM implemented by the FSM engine 600. The SMEs 604, 605 can be coupled together by using the programmable switches as described below. Accordingly, a FSM can be implemented on the FSM engine 600 by programming the SMEs 604, 605 to correspond to the functions of states and by selectively coupling together the SMEs 604, 605 to correspond to the transitions between states in the FSM.

Figure 6:
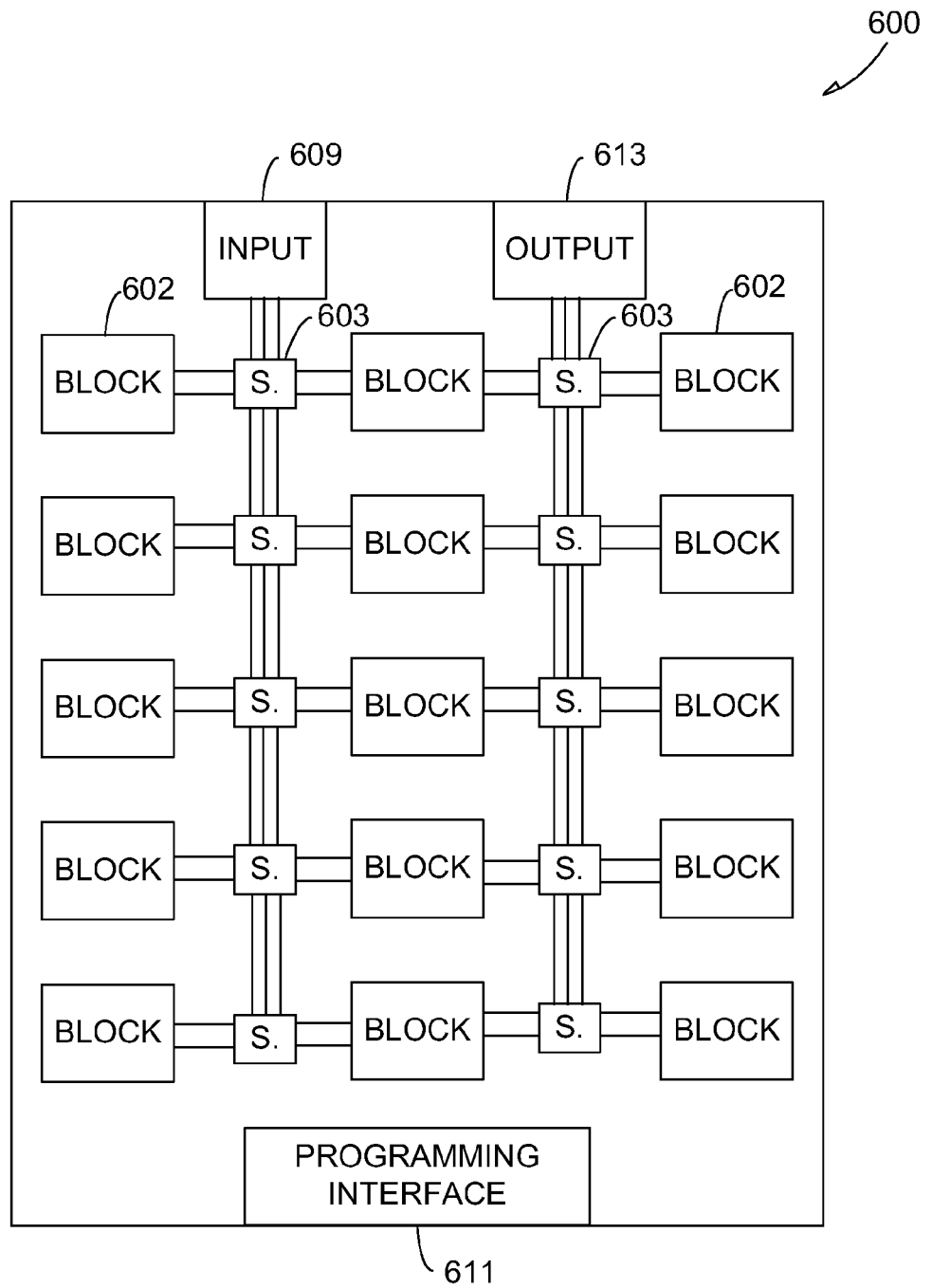
FIG. 6 illustrates an example of the parallel machine of FIG. 5 implemented as a finite state machine engine, according to various embodiments of the invention.

FIG. 6 illustrates an overall view of an example FSM engine 600. The FSM engine 600 includes a plurality of blocks 602 that can be selectively coupled together with programmable inter-block switches 603. Additionally, the blocks 602 can be selectively coupled to an input block 609 (e.g., a data input port) for receiving signals (e.g., data) and providing the data to the blocks 602. The blocks 602 can also be selectively coupled to an output block 613 (e.g., an output port) for providing signals from the blocks 602 to an external device (e.g., another FSM engine 600). The FSM engine 600 can also include a programming interface 611 to load a program (e.g., an image) onto the FSM engine 600. The image can program (e.g., set) the state of the SMEs 604, 605. That is, the image can configure the SMEs 604, 605 to react in a certain way to a given input at the input block 609. For example, a SME 604 can be set to output a high signal when the character 'a' is received at the input block 609.

In an example, the input block 609, the output block 613, and/or the programming interface 611 can be implemented as registers such that writing to the registers provides data to or from the respective elements. Accordingly, bits from the image stored in the registers corresponding to the programming interface 611 can be loaded on the SMEs 604, 605. Although FIG. 6 illustrates a certain number of conductors (e.g., wire, trace) between a block 602, input block 609, output block 613, and an inter-block switch 603, it should be understood that in other examples, fewer or more conductors can be used.

Figure 7:
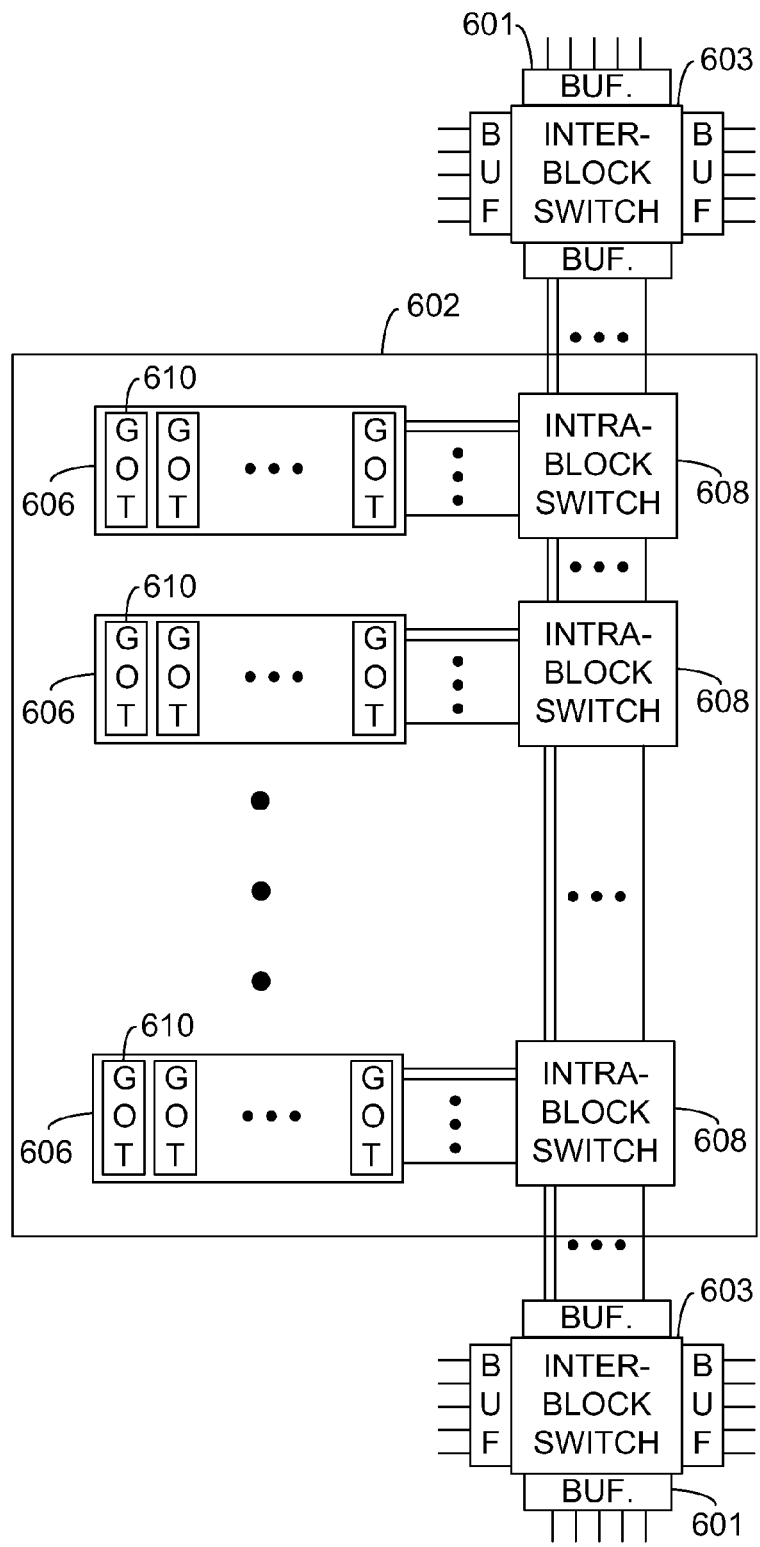
FIG. 7 illustrates an example of a block of the finite state machine engine of FIG. 6, according to various embodiments of the invention.

FIG. 7 illustrates an example of a block 602. A block 602 can include a plurality of rows 606 that can be selectively coupled together with programmable intra-block switches 608. Additionally, a row 606 can be selectively coupled to another row 606 within another block 602 with the inter-block switches 603. In an example, buffers 601 are included to control the timing of signals to/from the inter-block switches 603. A row 606 includes a plurality of SMEs 604, 605 organized into pairs of elements that are referred herein as groups of two (GOTs) 610. In an example, a block 602 comprises sixteen (16) rows 606.

FIG. 8 illustrates an example of a row 606. A GOT 610 can be selectively coupled to other GOTs 610 and any other elements 624 within the row 606 by programmable intra-row switches 612. A GOT 610 can also be coupled to other GOTs 610 in other rows 606 with the intra-block switch 608, or other GOTs 610 in other blocks 602 with an inter-block switch 603. In an example, a GOT 610 has a first and second input 614, 616, and an output 618. The first input 614 is coupled to a first SME 604 of the GOT 610 and the second input 614 is coupled to a second SME 604 of the GOT 610.

In an example, the row 606 includes a first and second plurality of row interconnection conductors 620, 622. In an example, an input 614, 616 of a GOT 610 can be coupled to one or more row interconnection conductors 620, 622, and an output 618 can be coupled to one row interconnection conductor 620, 622. In an example, a first plurality of the row interconnection conductors 620 can be coupled to each SME 604 of each GOT 610 within the row 606. A second plurality of the row interconnection conductors 622 can be coupled to one SME 604 of each GOT 610 within the row 606, but cannot be coupled to the other SME 604 of the GOT 610. In an example, a first half of the second plurality of row interconnection conductors 622 can couple to first half of the SMEs 604 within a row 606 (one SME 604 from each GOT 610) and a second half of the second plurality of row interconnection conductors 622 can couple to a second half of the SMEs 604 within a row 606 (the other SME 604 from each GOT 610). The limited connectivity between the second plurality of row interconnection conductors 622 and the SMEs 604, 605 is referred to herein as "parity".

In an example, the row 606 can also include a special purpose element 624 such as a counter, a programmable Boolean logic element, a field programmable gate array (FPGA), an application specific integrated circuit (ASIC), a programmable processor (e.g., a microprocessor), and other elements. Additionally, in an example, the special purpose element 624 is different in different rows 606. For example four of the rows 606 in a block 602 can include Boolean logic as the special purpose element 624, and the other eight rows 606 in a block 602 can include a counter as the special purpose element 624.

In an example, the special purpose element 624 includes a counter (also referred to herein as counter 624). In an example, the counter 624 comprises a 12-bit programmable down counter. The 12-bit programmable counter 624 has a counting input, a reset input, and zero-count output. The counting input, when asserted, decrements the value of the counter 624 by one. The reset input, when asserted, causes the counter 624 to load an initial value from an associated register. For the 12-bit counter 624, up to a 12-bit number can be loaded in as the initial value. When the value of the counter 624 is decremented to zero (0), the zero-count output is asserted. The counter 624 also has at least two modes, pulse and hold. When the counter 624 is set to pulse mode, the zero-count output is asserted during the first clock cycle when the counter 624 decrements to zero, and at the following clock cycles the zero-count output is no longer asserted even if the counting input is asserted. This state continues until the counter 624 is reset by the reset input being asserted. When the counter 624 is set to hold mode the zero-count output is asserted during the first clock cycle when the counter 624 decrements to zero, and stays asserted when the counting input is asserted until the counter 624 is reset by the reset input being asserted.

Figure 9:
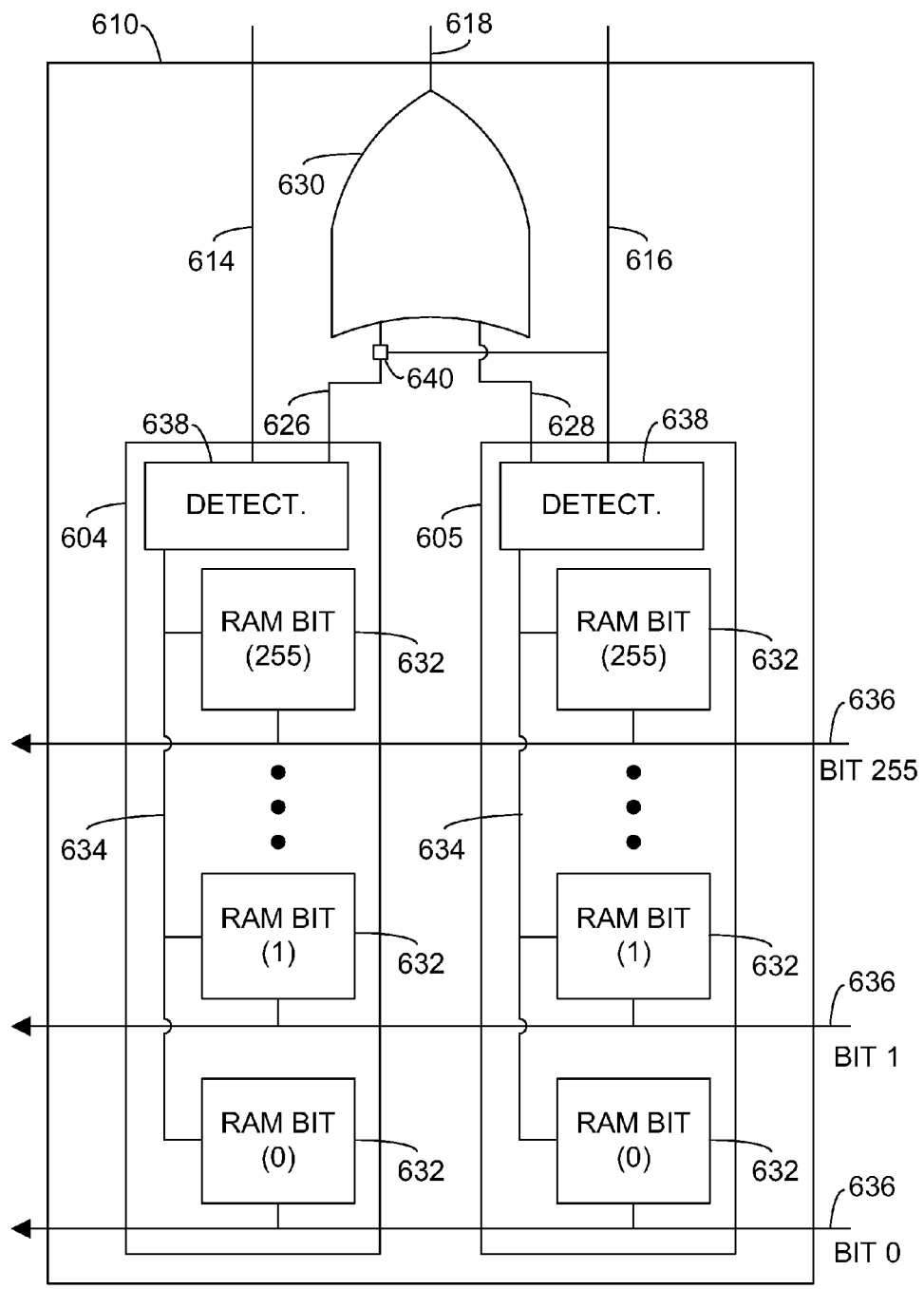
FIG. 9 illustrates an example of a group of two of the row of FIG. 8, according to various embodiments of the invention.

FIG. 9 illustrates an example of a GOT 610. The GOT 610 includes a first and a second SME 604, 605 having inputs 614, 616 and having their outputs 626, 628 coupled to an OR gate 630. The outputs 626, 628 are logical OR'd together with the OR gate 630 to form the common output 618 of the GOT 610. In an example, the first and second SME 604, 605 exhibit parity where the input 614 of the first SME 604 can be coupled to some of the row interconnection conductors 622 and the input 616 of the second SME 605 can be coupled to other row interconnection conductors 622. In an example, the two SMEs 604, 605 within a GOT 610 can be cascaded by setting the switch 640 to couple the output 626 of the first SME 604 to the input 616 of the second SME 605.

In an example, a state machine element 604, 605 comprises a plurality of memory cells 632, such as those often used in dynamic random access memory (DRAM), coupled in parallel to a detect line 634. One such memory cell 632 comprises a memory cell that can be set to a data state, such as one that corresponds to either a high or a low value (e.g., a 1 or 0). The output of the memory cell 632 is coupled to the detect line 634 and the input to the memory cell 632 receives signals based on data on the data stream line 636. In an example, an input on the data stream line 636 is decoded to select one of the memory cells 632. The selected memory cell 632 provides its stored data state as an output onto the detect line 634. For example, the data received at the data input port 609 can be provided to a decoder (not shown) and the decoder can select one of the data stream lines 636. In an example, the decoder can convert an ACSII character to 1 of 256 bits.

A memory cell 632, therefore, outputs a high signal to the detect line 634 when the memory cell 632 is set to a high value and the data on the data stream line 636 corresponds to the memory cell 632. When the data on the data stream line 636 corresponds to the memory cell 632 and the memory cell 632 is set to a low value, the memory cell 632 outputs a low signal to the detect line 634. The outputs from the memory cells 632 on the detect line 634 are sensed by a detect circuit 638. In an example, the signal on an input line 614, 616 sets the respective detect circuit 638 to either an active or inactive state. When set to the inactive state, the detect circuit 638 outputs a low signal on the respective output 626, 628 regardless of the signal on the respective detect line 634. When set to an active state, the detect circuit 638 outputs a high signal on the respective output line 626, 628 when a high signal is detected from one of the memory cells 634 of the respective SME 604, 605. When in the active state, the detect circuit 638 outputs a low signal on the respective output line 626, 628 when the signals from all of the memory cells 634 of the respective SME 604, 605 are low.

In an example, an SME 604, 605 includes 256 memory cells 632 and each memory cell 632 is coupled to a different data stream line 636. Thus, an SME 604, 605 can be programmed to output a high signal when a selected one or more of the data stream lines 636 have a high signal thereon. For example, the SME 604 can have a first memory cell 632 (e.g., bit 0) set high and all other memory cells 632 (e.g., bits 1-255) set low. When the respective detect circuit 638 is in the active state, the SME 604 outputs a high signal on the output 626 when the data stream line 636 corresponding to bit 0 has a high signal thereon. In other examples, the SME 604 can be set to output a high signal when one of multiple data stream lines 636 have a high signal thereon by setting the appropriate memory cells 632 to a high value.

In an example, a memory cell 632 can be set to a high or low value by reading bits from an associated register.

Accordingly, the SMEs 604 can be programmed by storing an image created by the compiler into the registers and loading the bits in the registers into associated memory cells 632. In an example, the image created by the compiler includes a binary image of high and low (e.g., 1 and 0) bits. The image can program the FSM engine 600 to operate as a FSM by cascading the SMEs 604, 605. For example, a first SME 604 can be set to an active state by setting the detect circuit 638 to the active state. The first SME 604 can be set to output a high signal when the data stream line 636 corresponding to bit 0 has a high signal thereon. The second SME 605 can be initially set to an inactive state, but can be set to, when active, output a high signal when the data stream line 636 corresponding to bit 1 has a high signal thereon. The first SME 604 and the second SME 605 can be cascaded by setting the output 626 of the first SME 604 to couple to the input 616 of the second SME 605. Thus, when a high signal is sensed on the data stream line 636 corresponding to bit 0, the first SME 604 outputs a high signal on the output 626 and sets the detect circuit 638 of the second SME 605 to an active state. When a high signal is sensed on the data stream line 636 corresponding to bit 1, the second SME 605 outputs a high signal on the output 628 to activate another SME 605 or for output from the FSM engine 600.

Figure 10:
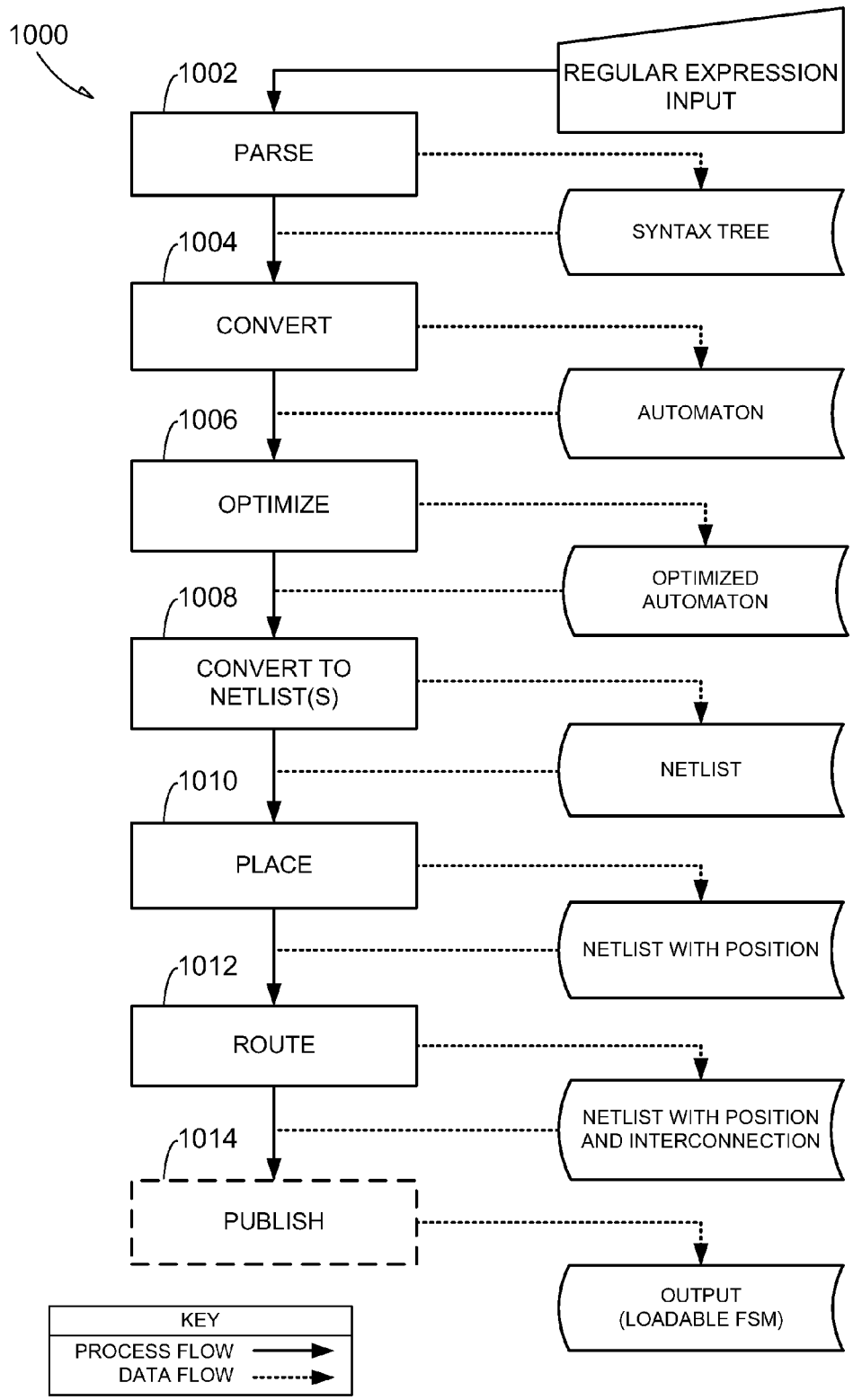
FIG. 10 illustrates an example of a method for a compiler to convert source code into an image configured to program the parallel machine of FIG. 5, according to various embodiments of the invention.

FIG. 10 illustrates an example of a method 1000 for a compiler to convert source code into an image configured to program a parallel machine. Method 1000 includes parsing the source code into a syntax tree (block 1002), converting the syntax tree into an automaton (block 1004), optimizing the automaton (block 1006), converting the automaton into a netlist (block 1008), placing the netlist on hardware (block 1010), routing the netlist (block 1012), and publishing the resulting image (block 1014).

In an example, the compiler includes an application programming interface (API) that allows software developers to create images for implementing FSMs on the FSM engine 600. The compiler provides methods to convert an input set of regular expressions in the source code into an image that is configured to program the FSM engine 600. The compiler can be implemented by instructions for a computer having a Von Nuemann architecture. These instructions can cause a processor on the computer to implement the functions of the compiler. For example, the instructions, when executed by the processor, can cause the processor to perform actions as described in blocks 1002, 1004, 1006, 1008, 1010, 1012, and 1014 on source code that is accessible to the processor. An example computer having a Von Nuemann architecture is shown in FIG. 15 and described below.

At block 1002, regular expressions are parsed to form a syntax tree. Parsing creates a generic representation of the source code as explained above with respect to FIG. 3. In addition, parsing can take into account regexes that are, and are not, supported by the FSM engine 600. Regexes that are supported can be converted into the appropriate machine code implementations; however, regexes that are not supported can, for example, generate an error, or be converted into supported machine code that is close in functionality to the non-supported regex.

At block 1004, the syntax tree is converted into an automaton. As mentioned above with respect to FIG. 3, converting the syntax tree converts the syntax tree into an automaton comprising a plurality of states. In an example, the automaton can be converted based partly on the hardware of the FSM engine 600.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, the data accepted (e.g., matched) by an automaton is the set of all possible data which when input sequentially into the automaton will reach a final state. Each symbol in the data accepted by the automaton traces a path from the start state to one or more final states. The data accepted by a regular expression is the set of all possible character strings which match the regular expression. Given a regular expression "R", denote the accepted data of "R" as £(R).

In an example, the automaton comprises general purpose states as well as special purpose states. In an example where the compiler is generating machine code for the FSM engine 600, the general purpose states can correspond to SMEs 604, 605 and the general purpose states are accordingly referred to herein as "SME states". Moreover, when the compiler is generating machine code for the FSM engine 600, a special purpose states can correspond to a counter 624 and is accordingly referred to herein as a "counter state". In an example, the SME states in the automaton map 1:1 to SMEs (e.g., SME 604, 605) in the FSM engine 600 with the exception of the starting state of the automaton which does not map to a SME. The counters 624 may, or may not, map 1:1 to counter states.

In an example, special transition symbols outside the input symbol range may be used in the automaton. These special transition symbols can be used, for example, to enable use of special purpose elements 224. Moreover, special transition symbols can be used to provide transitions that occur on something other than an input symbol. For example, a special transition symbol may indicate that a first state is to be enabled (e.g., transitioned to) when both a second state and a third state are enabled. Accordingly, the first state is activated when both the second state and the third state are activated, and the transition to the first state is not directly dependent on an input symbol. Notably, a special transition symbol that indicates that a first state is to be enabled when both a second state and a third state are enabled can be used to represent a Boolean AND function performed, for example, by Boolean logic as the special purpose element 224. In an example, a special transition symbol can be used to indicate a counter state has reached zero, and thus transitions to a downstream state.

In an example, an automaton can be constructed using one of the standard techniques such as Glushkov's method. In an example, the automaton can be an &free homogeneous automaton. Additional detail regarding converting the syntax tree into an automaton is provided with respect to FIGS. 4, 11, 12, 13A, 13B, and 14 below.

At block 1006, once the syntax tree has been converted to an automaton, the automaton is optimized. The automaton can be optimized to, among other things reduce its complexity and size. The automaton can be optimized by combining redundant states.

At block 1008, the optimized automaton is converted into a netlist. Converting the automaton into a netlist maps each state of the automaton to an instance of a hardware element (e.g., SMEs 604, 605, special purpose elements 624) on the FSM engine 600. Also, the connections between the instances are determined to create the netlist.

At block 1010, the netlist is placed to select a specific hardware element of the target device (e.g., SMEs 604, 605, special purpose elements 624) for each instance of the netlist. In an example, placing selects each specific hardware element based on general input and output constraints for of the FSM engine 600.

At block 1012, the placed netlist is routed to determine the settings for the programmable switches (e.g., inter-block switches 603, intra-block switches 608, and intra-row switches 612) in order to couple the selected hardware elements together to achieve the connections described by the netlist. In an example, the settings for the programmable switches are determined by determining specific conductors of the FSM engine 600 that will be used to connect the selected hardware elements, and the settings for the programmable switches. Routing can take into account more specific limitations of the connections between the hardware elements that placement at block 1010. Accordingly, routing may adjust the location of some of the hardware elements as determined by the global placement in order to make appropriate connections given the actual limitations of the conductors on the FSM engine 600.

Once the netlist is placed and routed, the placed and routed netlist can be converted into a plurality of bits for programming of a FSM engine 200. The plurality of bits are referred to herein as an image.

At block 1014, an image is published by the compiler. The image comprises a plurality of bits for programming specific hardware elements and/or programmable switches of the FSM engine 600. In embodiments where the image comprises a plurality of bits (e.g., 0 and 1), the image can be referred to as a binary image. The bits can be loaded onto the FSM engine 600 to program the state of SMEs 604, 605, the special purpose elements 624, and the programmable switches such that the programmed FSM engine 600 implements a FSM having the functionality described by the source code. Placement (block 1010) and routing (block 1012) can map specific hardware elements at specific locations in the FSM engine 600 to specific states in the automaton. Accordingly, the bits in the image can program the specific hardware elements and/or programmable switches to implement the desired function(s). In an example, the image can be published by saving the machine code to a computer readable medium. In another example, the image can be published by displaying the image on a display device. In still another example, the image can be published by sending the image to another device, such as a programming device for loading the image onto the FSM engine 600. In yet another example, the image can be published by loading the image onto a parallel machine (e.g., the FSM engine 600).

In an example, an image can be loaded onto the FSM engine 600 by either directly loading the bit values from the image to the SMEs 604, 605 and other hardware elements 624 or by loading the image into one or more registers and then writing the bit values from the registers to the SMEs 604, 605 and other hardware elements 624. In an example, the hardware elements (e.g., SMEs 604, 605, other elements 624, programmable switches 603, 608, 612) of the FSM engine 600 are memory mapped such that a computer (e.g., a programming device coupled to or integral with the computer) can load the image onto the FSM engine 600 by writing the image to one or more memory addresses.

FIG. 4, as discussed above, details a method 400 for converting a syntax tree into an automaton. The following description provides additional detail for converting a syntax tree into an automaton when the target device is a parallel machine, for example, the FSM engine 600.

One type of regex that can be described in the source code includes a quantification. Quantifications are well known in the art, and are used to describe repeated patterns. As an example, "A(B){n1, n2}C" is a general regular expression, where A, B and C are sub-expressions, and "(B){n1, n2}" comprises a quantification. As described herein, upper-case letters are used to represent regular expressions or a portion of a regular expression (e.g., a sub-expression). Double quotation marks may be added around regular expressions or sub-expressions to avoid confusion. Accordingly, an upper-case letter describing an expression can correspond to a search string for multiple input symbols. For example, the expression "A" can correspond to the input string 'abbc'.

Moreover, it should be understood that the terms expression and sub-expression are used herein for relational description only (e.g., a sub-expression is a portion of an expression), and that the terms expression and sub-expression should not be limited to any specific length, syntax, or number of characters. In particular, source code can include a large number of characters (including meta-characters and search characters) of which the entire set of characters or any individual portion thereof can be considered an "expression". For example, each of the following can be considered an expression "a(bb|d?){5, 20}c", "(b){0, 10}", "(b|d)", and "b".

A quantification is expressed in regex as "(B){n1, n2}", where B is a sub-expression, and n1 and n2 are integers specifying how many times the preceding sub-expression is allowed to occur. B is referred to herein as a repeated sub-expression since B is a sub-expression that is repeated the number of times specified by n1 and n2. To match the quantification "(B){n1, n2}", the repeated sub-expression B must be matched from n1 to n2 number of times. For example, the regex "(B){5, 7}" would require the sub-expression B to be matched 5, 6, or 7 times. In the regex "A(B){n1, n2}C", the sub-expression A is referred to herein as a drive expression, since the sub-expression A, when matched, transitions to a quantification. Additionally, to continue repeating and incrementing the count for the quantification, the repeated sub-expression(s) of the quantification must be matched consecutively. That is, when a repeated sub-expression is not matched during a given loop of the quantification, the quantification ends. In an example, the symbol '?' also corresponds to quantification, where the symbol preceding the '?' can be identified either one or zero times.

When the target device is the FSM engine 600, the method 400 can identify and map certain quantifications to the counters 624 on the FSM engine 600. Implementing certain quantifications with the counters 624 can result in efficiencies over implementing the quantifications with the state machine elements 604, 605. Accordingly, the automaton and the resulting image for the FSM engine 600 can be simplified. For example, portions of the syntax tree implementing quantifications can require a large amount of SMEs 604, 605 to implement. In an example, however, some of these quantifications can be implemented using a counter 624 with fewer states than would be required by SMEs 604, 605.

At block 402, the compiler identifies portions of the syntax tree that correspond to a quantification for possible implementation with the counters 624 in the FSM engine 600. If the portion of the syntax tree does not correspond to a quantification, the method 400 proceeds to block 408 where the portion is converted into general purpose states for implementation with SMEs 604, 605. If the portion of the syntax tree does correspond to a quantification, the quantification is further analyzed to determine whether the identified portion can be implemented with the counters 624.

Prior to making the determination of whether a quantification can be possibly implemented with a counter 624, if £(B) includes empty string, the quantification of "B{n1, n2}" is rewritten as "B'{0, n2}", where B' is the no-empty-string version of B, £(B')=£(B)−Φ. For example, "(bc|){10, 20}" can be rewritten to "(bc){0, 20}", since these regexes accept the exact same data. Then, for a given quantification B{n1, n2}, the quantification can possibly be implemented with a counter (method proceeds to block 404) or alternatively implemented with SMEs and no counter (method proceeds to block 408) according to the following conditions:

1) When (n1=0, n2=−1), the quantification is to be implemented with SMEs 604, 605 and no counter 624 (block 408). Here, no counter 624 is needed.
2) When (n1=1, n2=−1), the quantification is to be implemented with SMEs 604, 605 and no counter 624 (block 408). Here, no counter 624 is needed.
3) When (n1>1, n2=−1), the quantification is to be split into two regexes B{n1−1} and B+, since B{n, −1} equals B{n1−1}B+. The quantification B{n1−1} can then possibly be implemented with a counter (block 404) while B+ is to be implemented with SMEs 604, 605 and no counter 624 (block 408). For B+no counter 624 is needed.
4) When (n1=0, n2>0), the quantification is to be modified to (B{1, n2})? since (B{1, n2})? equals B{0, n2}. The non-nullable B{1, n2} can then possibly be implemented with a counter 624 (block 404).
5) When (n1>0, n2>0), the quantification can possibly be implemented as B{n1, n2} with a counter 624 (block 404).

In a summary, a quantification that can be possibly be implemented with a counter 624 (block 404) without modification can be written as B{n1, n2}, where B is not nullable, n1>0, n2>0, and n1<n2.

At block 404, once the compiler has identified a quantification that can possibly be implemented with a counter 624, the compiler determines whether a portion of the syntax tree corresponding to the identified portion is deterministic. When the identified portion is deterministic, the identified portion can be implemented with one or more counters 624, and the method 400 proceeds to block 406 where the identified portion is converted into one or more counter states along with one or more SME states. When the identified portion is non-deterministic, the identified portion is not implemented using a counter 624, and the method 400 proceeds to block 408 where the identified portion is converted into one or more SME states.

Generally, block 406 and block 408 correspond to the two ways to convert a quantification into an automaton. At block 406, the quantification is converted using one or more counter states, possibly in conjunction with one or more SME states to implement the quantification as a loop. At block 408, the quantification is converted by "unrolling" the quantification which includes using SME states and no counter states. Unrolling comprises rewriting the quantification with non-quantification syntax. For example, the regex "(b|c){1,2}" can be unrolled as "(b|c)(b|c)?". The merits of unrolling include (1) the resulted automaton is a directed acyclic graph (DAG) and can be easy to analyze and implement and (2) the resulting automaton can be implemented with general purpose elements, especially state machine elements, instead of special purpose elements. However, the number of general purpose states, and thus state machine elements, used to implement the unrolled quantification is linear to n1 and n2. Thus, the number of states may be large when n1 or n2 is a large number. In particular, real-life resources are limited, thus, in some examples this unrolling technique is used for only a limited category of quantifications.

When the target device, however, has a special purpose element designed to implement a counting function, such as a counter 624, unrolling can be avoided in certain instances. The merit of this method is that fewer copies of a repeated expression are needed in the automaton, and the number of copies is independent of n1 and n2. Therefore, significant resources can be saved. For example, one or more counters 624 can be used to implement the quantification by creating a loop with the repeated expression(s) and the one or more counters 624. Each time the repeated expression(s) is matched, a counter 624 can be incremented (or decremented). The repeated expression(s) can then be re-activated to search for another match. When the counter 624 has been incremented (or decremented) equal to a number of times stated by the quantification, the counter 624 can activate the state(s) following the quantification. Accordingly, the quantification can be implemented with fewer SMEs 604, 605 since the SMEs used to implement the repeated expression(s) are re-used. However, due to the parallelism of the entire automaton (e.g., corresponding to the entire syntax tree), that is, multiple states that can be active at the same time, the counters 624, in some examples, can only be used with quantifications that correspond to deterministic portions of the entire automaton.

Figure 11:
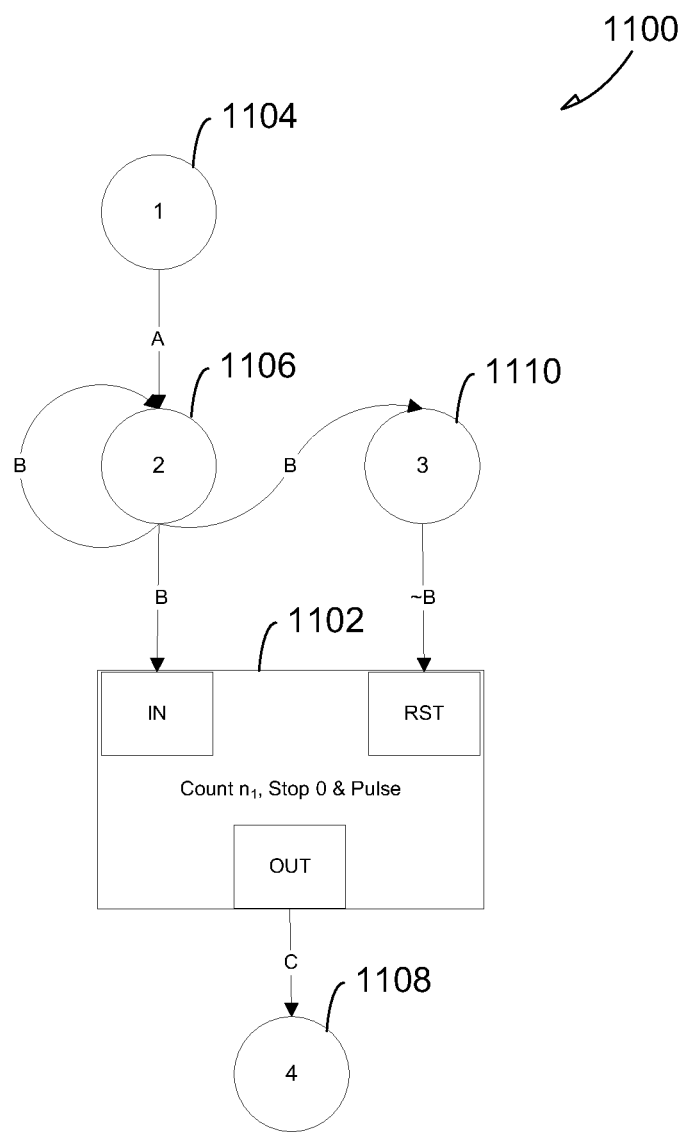
FIG. 11 illustrates an example automaton having a special purpose counter state, according to various embodiments of the invention.

FIG. 11 illustrates an example of a regex converted into an automaton 1100 using a special purpose counter state 1102 to implement a quantification. The automaton 1100 corresponds to the regex "A(B){n1, n1}C" where both counting values (e.g., n1, n2) of the quantification are equal. Since both of the counting values are equal, a single counter 624 is used to implement the quantification. As shown in FIG. 11, the automaton 1100 can be represented as a directed graph where the nodes of the graph correspond to a set of states.

The regex "A(B){n1, n1}C" is converted into a several SME states 1104, 1106, 1110, 1108, and a counter state 1102. The SME states 1104, 1106, 1108, 1110 correspond to the sub-expressions "A", "B", and "C". The SME states 1104, 1106, 1110, 1108 can be implemented with SMEs 604, 605, while the counter state 1102 can be implemented with a counter 624. When the automaton 1110 is implemented on the FSM engine 600, a counter 624 corresponding to the counter state 1102 is initially loaded with the value n1 and set to assert the zero-count output when the value in the counter 624 reaches zero. When n1 equals n2, the counter 624 can be set to Stop 0 and Pulse Output mode, which means that the counter 624 will assert its output once its value reaches zero, and the counter 624 will remain at zero and not issue any signal until the counter 624 is reset.

The automaton 1100 begins at state 1104 and transitions to state 1106 upon matching the sub-expression "A". While at state 1106, each time the sub-expression "B" is matched, the IN port of the counter state 1102 is activated and the counter state 1102 decrements by one. Additionally, each time the sub-expression "B" is matched state 1106 activates itself as well as activating state 1110. When the counter state 1102 reaches zero, the output is activated and the automaton 1100 will then search for the sub-expression "C". In the following cycle, two scenarios will occur: the first scenario occurs when "~B" is matched. When "~B" is matched the counter state 1102 is reset and its value is set back to n1. Accordingly, the next time the sub-expression "A" is matched the process starts over from state 1104. In the second scenario, the self loop of state 1106 is still active and the IN port of the counter 1102 continues to be triggered on a match of the sub-expression "B". Since the counter state 1102 is configured in pulse mode, the counter state 1102 will not activate its output again although the self-loop of state 1106 remains active.

The negated version of the sub-expression "B is also referred to herein as "~B". In an example, the negated version of the sub-expression "B" is used to activate the reset port of the counter state 1102. This is because since, "B" is the repeated expression of the quantification "(B){n1, n1}", when anything other than B (e.g., the negated version of "B") is received at the input (once state 1106 has been activated), the quantification ends and the counter is accordingly reset. Accordingly, once state 1110 is activated, the counter state 1102 is reset and the quantification is not matched when the negated version of the sub-expression "B" is matched. In an example, the repeated expression(s) are negated using standard automaton theory.

Although a single counter state 624 is illustrated and described to implement a quantification when n1 equals n2, it should be recognized that multiple counters 624 can be cascaded as to account for numbers larger than supported by a single counter 624.

Figure 12:
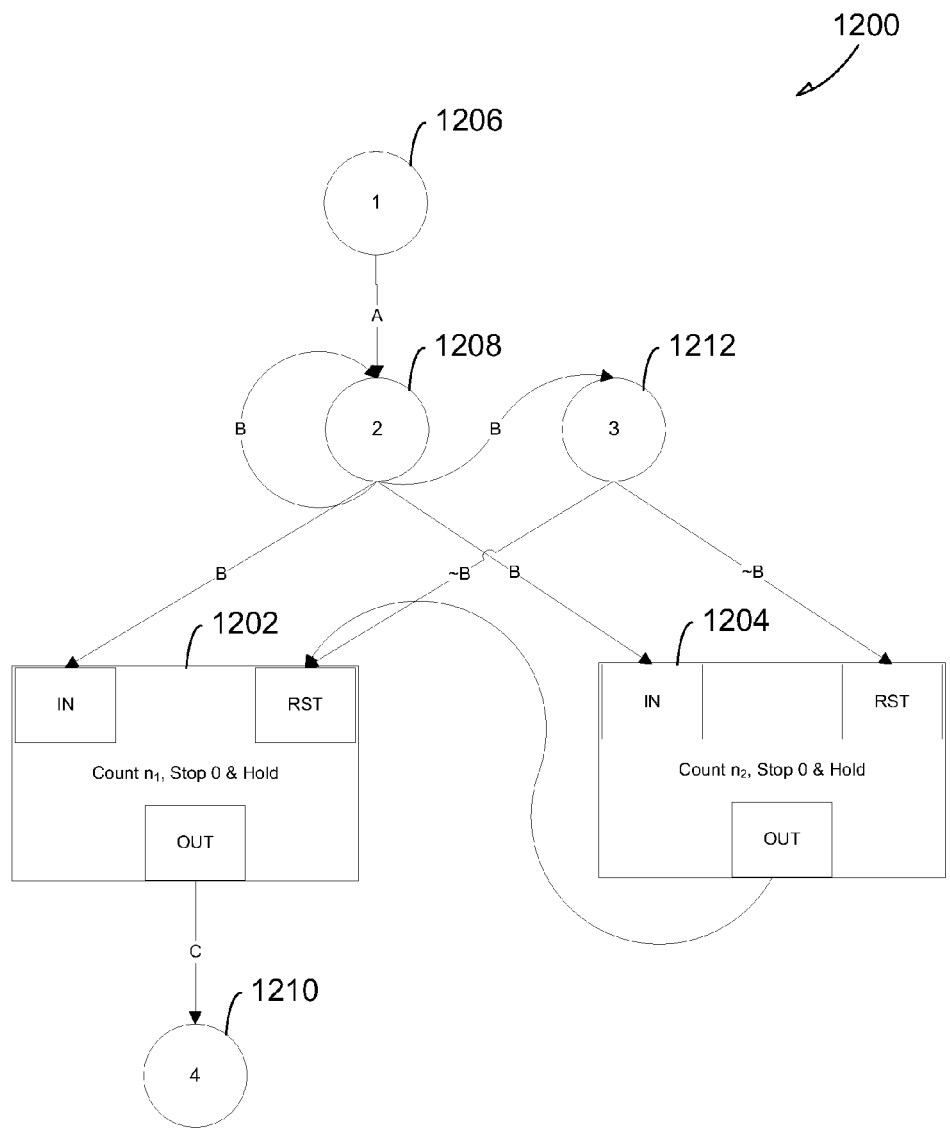
FIG. 12 illustrates another example automaton having a special purpose counter state, according to various embodiments of the invention.

FIG. 12 illustrates another example of a regex converted into an automaton 1200 using a plurality of special purpose counter states 1202, 1204 to implement a regex with a quantification. The automaton 1200 corresponds to the regex "A(B){n1, n2}C", where n1 is less than n2. Two counter states 1202, 1204 are used since n1 is less than n2 in the quantification "(B){n1, n2}". The counter states 1202, 1204 are configured to Stop 0 and Hold mode, which means that the counter states 1202, 1204 activate their output when the counter states 1202, 1204 reaches zero, and before the counter states 1202, 1204 are reset, the counter states 1202, 1204 remain at zero and keep activating their output each time the IN port is activated. In this example, the latency from counter state 1202 to counter state 1204 takes two cycles.

The counter state 1202 is initially set to n1, and the counter state 1204 is initially set to n2. The automaton transitions from state 1206 to state 1208 when the sub-expression "A" is matched. Once state 1208 is activated, the IN port of both counter state 1202 and counter state 1204 are activated each time that the sub-expression "B" is matched. Accordingly, both counter state 1202 and counter state 1204 are decremented by one. When counter state 1202 reaches zero, its output is activated and the automaton 1200 then searches for a match of the sub-expression "C" and activate state 1210. Once the sub-expression "B" has been matched n1 times, the value of the counter state 1204 is n2−n1. Later on, each time that the sub-expression "B" is matched, the IN port of counter state 1202 is activated and value of counter state 1202 remains at zero and its output is still activated. Meanwhile, the counter state 1204 continues to be decremented. When the sub-expression "B" is matched n2 times, the counter state 1204 also reaches zero and its output is activated which drives the reset port of counter state 1202. Since the counter state 1204 to counter state 1202 latency is two cycles, the counter state 1202 continues activating its output to state 1210. In the next cycle, the counter state 1202 is reset from the output of counter state 1204 and no output is asserted from the counter state 1202. In the following cycle, two scenarios will occur. In the first scenario, "~B" is matched. Both counter state 1202 and counter state 1204 are reset by state 1212 and their values are set to n1 and n2 respectively. Accordingly, the next time state 1206 is active and the next time the sub-expression "A" is matched, state 1208 is activated and the counter states 1202, 1204 being decrementing again. In the second scenario, the self loop of state 1208 remains activated and both counter states 1202, 1204 IN ports are activated. Since the counter state 1204 continually activates its output, the counter state 1202 is continually reset and does not activate its output as long as the self-loop of state 1208 is active.

In addition, a match of the sub-expression "B" while state 1208 is active, activates the state 1212. Once state 1212 is activated and "~B" is matched, the counter states 1202, 1204 are reset and the quantification is not matched. The negated version of the sub-expression "B" is used since "B" is the repeated expression of the quantification "(B){n1, n2}". Accordingly, the expression 'B' at state 1208 can be matched repeatedly for from n1 to n2 number of times. Although a single counter is illustrated and described to implement the lower (e.g., n1) and upper (e.g., n2) thresholds respectively, it should be recognized that multiple counters can be cascaded as known to those skilled in the art to count for numbers larger than supported by a single counter.

Prior to converting a quantification using a counter state, the compiler, at block 404, determines whether an automaton corresponding to the quantification is deterministic. In an example, the automaton is deterministic when the expression meets both the no-prefix the no re-entrance conditions discussed below. That is, in order for a quantification to be mapped to a counter 624, the quantification should meet the no-prefix and no re-entrance conditions as discussed below.

Referring to automaton 1200 of FIG. 12, the no re-entrance condition requires that the edge from state 1206 to state 1208 cannot be activated, while the counter state 1202 is active (e.g., while the counter state 1202 is counting). That is, it is determined whether the drive expression for the quantification can be matched while the quantification is already being processed. Matching a drive expression means that the states immediately prior to the quantification will transition to the states corresponding to the quantification. Accordingly, the quantification will be "re-entered" while a counter state is still processing a repeated expression. Since, in this example of the FSM engine 600, a counter 624 can only implement a single loop at any given time, transitioning to a quantification while a loop is already being processed can cause the counter 624 to count incorrectly during a given loop.

Figure 13A:
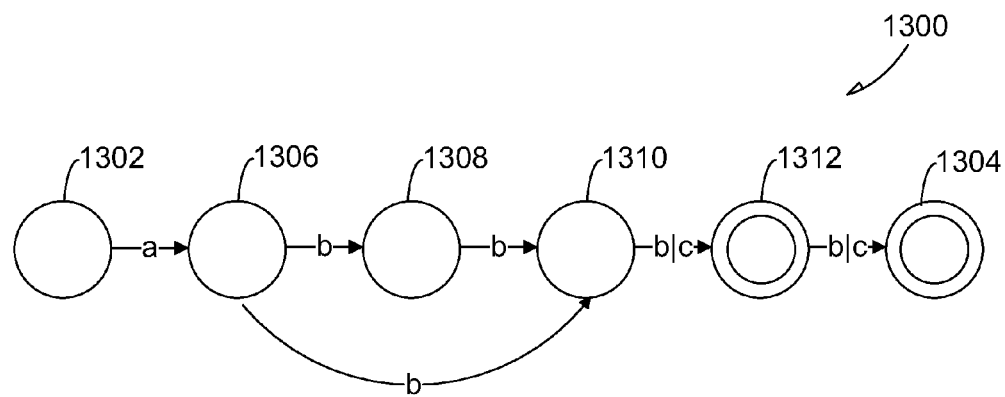
FIGS. 13A and 13B illustrate example automatons, according to various embodiments of the invention.
Figure 13B:
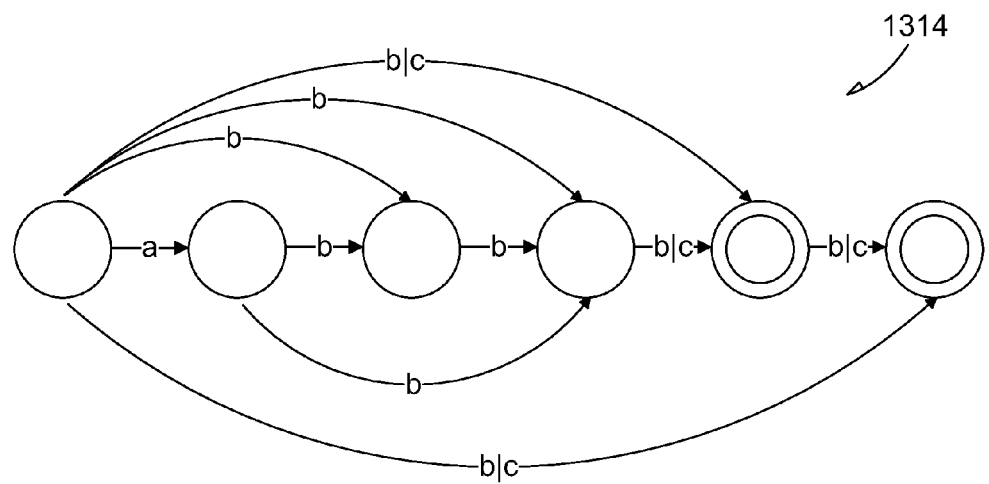

FIGS. 13A and 13B illustrate automatons 1300 and 1314 can be used to further explain the no re-entrance condition. FIG. 13A illustrates an example automaton 1300 corresponding to a quantification in a syntax tree in which the compiler can analyze to determine whether an automaton corresponding to the quantification is deterministic.

The automaton 1300 corresponds to the regular expression "abb?(b|c){1,2}" and includes a starting state 1302 and final states 1312, 1304. The final states are identified in FIG. 13A as double circles. The starting state 1302 is initially activated and transitions to state 1306 upon the input symbol 'a'. State 1306 transitions to both state 1308 and state 1310 on the input symbol 'b'. State 1308 transitions to state 1310 on the input symbol 'b', and state 1310 transitions to state 1312 on either the input symbol 'b' or 'c'. The automaton 1300 transitions from state 1312 to state 1304 on either the input symbol 'b' or 'c'.

The automaton 1300 comprises the automaton for the regex "abb?(b|c){1,2}", which is to be checked for compliance with the no re-entrance condition. The automaton 1314 comprises the automaton of the derived regex SS("abb?","

(b|c){2}") from the regex "abb?(b|c){1,2}" of automaton 1300. SS(M, N) is defined as a regex derived from M, N. The deriving steps include: 1) concatenate M and N, and the result is denoted as "MN". 2) Construct the automaton for "MN", denoted as A(MN). 3) Modify A(MN) as following: a) Make the starting state of A(MN) drive all other states, and b) make all states corresponding to "N" as final states. Finally, 4) denote the regex for the modified automaton as SS(M, N). The accepted data of SS(M, N) is composed of the substrings that start from any state of "MN" and end at any state of N.

The no re-entrance condition can be defined as follows. Given a regular expression with a quantification "AB{n1, n2}C", the no re-entrance condition requires that £ (SS(A, B{n1, n2})∩£(A)=∅. In other words, once the sub-expression "A" is matched and the counter state 1202 begins to count, to meet the no re-entrance condition, the edge from state 1206 to state 1208 will not be activated again until "B{n1, n2}" is done (either match or fail). For example, "abb" ∈£("abb?")∩£(SS("abb?", "(b|c){2}"), and thus "abb?(b|c){1, 2}" will not be correctly implemented with a counter 624.

Figure 14:
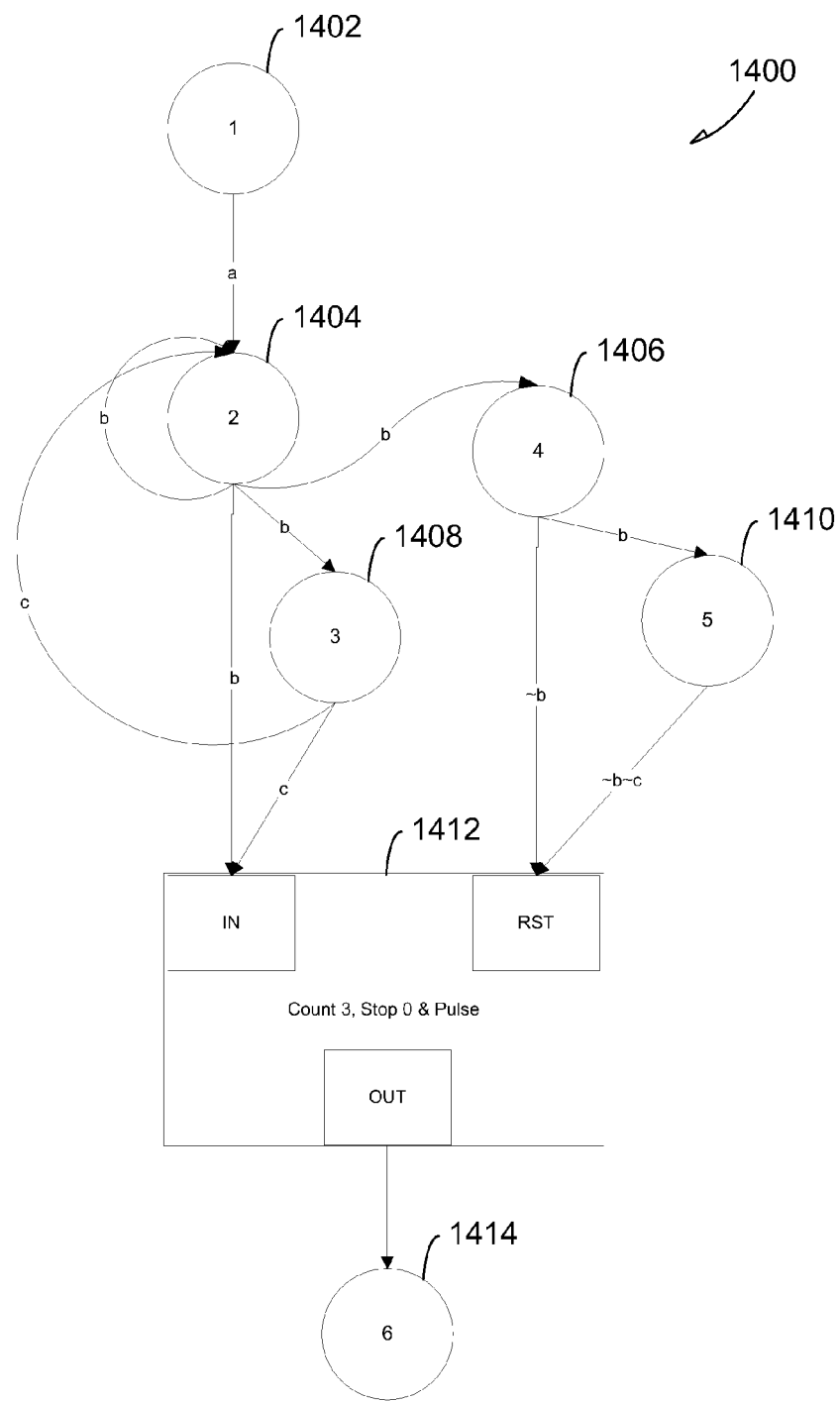
FIG. 14 illustrates an example automaton for a regex having a quantification that does not meet the no prefix condition, according to various embodiments of the invention.

Referring now to FIG. 14, the no prefix condition will be explained with reference to the automaton 1400. The no prefix condition states that any string of £(B) should not be the prefix of another string of £(B), which is to guarantee that B does not cause the counter(s) to count more than once. In other words, a quantification is not implemented as (and thus converted to) a counter 624 when a first repeated sub-expression of the quantification is a prefix of a second repeated sub-expression of the quantification. The formal statement is: For all $l_i$, $l_j \in £(B)$, $l_i \neq l_j$, we require $\{l_i.*\} \cap \{l_j.*\} = \emptyset$.

For example, the regex "a(b|bc){3}" does not meet the no prefix condition. Accordingly, the regex "a(b|bc){3}" would not be converted using a counter state and thus would not be implemented with a counter 624. Instead, the regex "a(b|bc){3}" would be converted into general purpose states without any counter states.

If the regex "a(b|bc){3}" were implemented with a counter 624, the input "abbc" would be falsely matched. For example, the automaton 1400 is the result of a hypothetical conversion of the regex "a(b|bc){3}" using a counter state 1412. As described below, this conversion results in incorrect performance of the counter state 1412. State 1402 is initially activated and at the input "a", state 1402 activates state 1404. With state 1404 activated, at the input "b", state 1404 activates states 1406, 1408, and re-activates itself, state 1404. Also, at the input "b", state 1404 activates the IN port of the counter 1412, where the initial value of the counter state 1412 is at 3 and is then reduced to 2. With the states 1404, 1406, and 1408 activated, the IN port of the counter state 1412 is activated by state 1404 again at another input "b" and the value in the counter state 1412 is reduced to 1. At this point, state 1404, 1406, and 1408 are activated. Then, an input value "c" causes the IN port of the counter state 1412 to be activated by state 1408 to reduce the value in the counter 1412 to 0. With the value in the counter 1412 at zero, the output is activated and state 1414 is activated indicating a match. This match, however, is a false positive since the input "abbc" has caused a match, when the sequence "abbc" does not meet the regex "a(b|bc){3}". Accordingly, the regex "a(b|bc){3}" does not meet the no prefix condition and should not be converted using a counter state and implemented with a counter 624.

If the quantification meets both the no prefix condition and the no re-entrance condition at block 404, then the quantification is converted using a special purpose counter state at block 406. The quantification can be converted as described with respect to FIGS. 12 and 13 above. If, however, the quantification does not meet either the no prefix or the no re-entrance condition, the quantification is converted at block 408 by unrolling the quantification and converting to general purpose states and no counter state 624. The quantification is accordingly implemented with SMEs 604, 605 and not a counter 624.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

FIG. 15 illustrates generally an example of a computer 1500 having a Von Nuemann architecture. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language, such as Java, C++, or one or more other languages. Alternatively, the programs can be structured in a procedure-orientated format using a procedural language, such as assembly, C, etc. The software components can communicate using any of a number of mechanisms well known to those of ordinary skill in the art, such as application program interfaces or interprocess communication techniques, including remote procedure calls or others. The teachings of various embodiments are not limited to any particular programming language or environment.

Thus, other embodiments can be realized. For example, an article of manufacture, such as a computer, a memory system, a magnetic or optical disk, some other storage device, or any type of electronic device or system can include one or more processors 1502 coupled to a computer-readable medium 1522 such as a memory (e.g., removable storage media, as well as any memory including an electrical, optical, or electromagnetic conductor) having instructions 1524 stored thereon (e.g., computer program instructions), which when executed by the one or more processors 1502 result in performing any of the actions described with respect to the methods above.

The computer 1500 can take the form of a computer system having a processor 1502 coupled to a number of components directly, and/or using a bus 1508. Such components can include main memory 1504, static or non-volatile memory 1506, and mass storage 1516. Other components coupled to the processor 1502 can include an output device 1510, such as a video display, an input device 1512, such as a keyboard, and a cursor control device 1514, such as a mouse. A network interface device 1520 to couple the processor 1502 and other components to a network 1526 can also be coupled to the bus 1508. The instructions 1524 can further be transmitted or received over the network 1526 via the network interface device 1520 utilizing any one of a number of well-known transfer protocols (e.g., HTTP). Any of these elements coupled to the bus 1508 can be absent, present singly, or present in plural numbers, depending on the specific embodiment to be realized.

In an example, one or more of the processor 1502, the memories 1504, 1506, or the storage device 1516 can each include instructions 1524 that, when executed, can cause the computer 1500 to perform any one or more of the methods described herein. In alternative embodiments, the computer 1500 operates as a standalone device or can be connected (e.g., networked) to other devices. In a networked environment, the computer 1500 can operate in the capacity of a server or a client device in server-client network environment, or as a peer device in a peer-to-peer (or distributed) network environment. The computer 1500 can include a personal computer (PC), a tablet PC, a set-top box (STB), a Personal Digital Assistant (PDA), a cellular telephone, a web appliance, a network router, switch or bridge, or any device capable of executing a set of instructions (sequential or otherwise) that specify actions to be taken by that device. Further, while only a single computer 1500 is illustrated, the term "computer" shall also be taken to include any collection of devices that individually or jointly execute a set (or multiple sets) of instructions to perform any one or more of the methodologies discussed herein.

The computer 1500 can also include an output controller 1528 for communicating with peripheral devices using one or more communication protocols (e.g., universal serial bus (USB), IEEE 1394, etc.) The output controller 1528 can, for example, provide an image to a programming device 1530 that is communicatively coupled to the computer 1500. The programming device 1530 can be configured to program a parallel machine (e.g., parallel machine 500, FSM engine 600). In other examples, the programming device 1530 can be integrated with the computer 1500 and coupled to the bus 1508 or can communicate with the computer 1500 via the network interface device 1520 or another device.

While the computer-readable medium 1524 is shown as a single medium, the term "computer-readable medium" should be taken to include a single medium or multiple media (e.g., a centralized or distributed database, or associated caches and servers, and or a variety of storage media, such as the processor 1502 registers, memories 1504, 1506, and the storage device 1516) that store the one or more sets of instructions 1524. The term "computer-readable medium" shall also be taken to include any medium that is capable of storing, encoding or carrying a set of instructions for execution by the computer and that cause the computer to perform any one or more of the methodologies of the present invention, or that is capable of storing, encoding or carrying data structures utilized by or associated with such a set of instructions. The term "computer-readable medium" shall accordingly be taken to include, but not be limited to tangible media, such as solid-state memories, optical, and magnetic media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Example Embodiments

Example 1 includes a computer-implemented method for generating machine code corresponding to a set of elements including a general purpose element and a special purpose element, the method comprising determining whether a portion in an arrangement of relationally connected operators meets a condition to be mapped to a special purpose element; mapping the portion to a special purpose element if the portion meets the condition; and converting the arrangement of relationally connected operators into machine code.

Example 2 includes a computer-readable medium including instructions, which when executed by the computer, cause the computer to perform operations comprising identifying a portion in an arrangement of relationally connected operators that corresponds to a special purpose element for a target device, wherein the target device also includes a general purpose element; determining whether the portion meets a condition to be mapped to the special purpose element; converting the arrangement into an automaton comprising a plurality of states, wherein the portion is converted using a special purpose state that corresponds to the special purpose element if the portion meets the condition; and converting the automaton into machine code.

Example 3 includes a computer comprising a memory having software stored thereon; and a processor communicatively coupled to the memory, wherein the software, when executed by the processor, causes the processor to compile regular expressions into code for a target device, wherein the target device supports a first type of element and at least one other type of element; wherein compile includes map a first regular expression that corresponds to the first type of element to the first type of element; and wherein compile includes map a second regular expression that does not correspond to the first type of element to the at least one other type of element.

Example 4 includes a system comprising a computer configured to identify a portion in an arrangement of relationally connected operators that corresponds to a special purpose element of a target device, wherein the target device also includes a general purpose element; determine whether the portion meets a condition to be mapped to the special purpose element; convert the arrangement into an automaton comprising a plurality of interconnected states, wherein the portion is converted into a special purpose state that corresponds to the special purpose element if the first portion meets the condition; and convert the automaton into machine code; and a device for programming a parallel machine, the device configured to load the machine code onto the parallel machine.

In Example 5, the subject matter of any of Examples 1-4 can optionally include wherein the machine code comprises an image for a parallel machine.

In Example 6, the subject matter of any of Examples 1-5 can optionally include wherein the set of elements include a set of instructions for execution on a processor, and wherein the special purpose element includes a special purpose instruction.

In Example 7, the subject matter of any of Examples 1-6 can optionally include identifying a portion in the arrangement of relationally connected operators that corresponds to a special purpose element, wherein determining whether a portion meets a condition, determines whether the portion that is identified meets a condition; wherein mapping includes converting the arrangement into an automaton comprising a plurality of states, wherein the portion is converted using a special purpose state that corresponds to the special purpose element if the portion meets the condition; and wherein converting the arrangement includes converting the automaton into machine code.

In Example 8, the subject matter of any of Examples 1-7 can optionally include wherein identifying a portion in the arrangement that corresponds to a special purpose element comprises identifying an operator of the relationally connected operators that can be implemented using the special purpose element.

In Example 9, the subject matter of any of Examples 1-8 can optionally include wherein converting the arrangement into an automaton comprises converting each of the operators in the arrangement into one or more of the plurality of states.

In Example 10, the subject matter of any of Examples 1-9 can optionally include wherein the portion is converted using a general purpose state and not using a special purpose state that corresponds to a special purpose element if the portion does not meet the condition, wherein the general purpose state corresponds to the general purpose element.

In Example 11, the subject matter of any of Examples 1-10 can optionally include wherein the portion comprises a first portion and wherein a second portion of the arrangement is converted using a general purpose state and not using a special purpose state that corresponds to a special purpose element if the second portion is not identified as corresponding to a special purpose element, where the general purpose state corresponds to a general purpose element.

In Example 12, the subject matter of any of Examples 1-11 can optionally include wherein the set of elements includes a set of hardware elements of a parallel machine, wherein the general purpose element comprises a programmable element and wherein the special purpose element includes a counter.

In Example 13, the subject matter of any of Examples 1-12 can optionally include wherein the programmable element comprises a state machine element.

In Example 14, the subject matter of any of Examples 1-13 can optionally include wherein the state machine element includes a memory cell.

In Example 15, the subject matter of any of Examples 1-13 can optionally include wherein the memory cell comprises a volatile memory cell.

In Example 16, the subject matter of any of Examples 1-15 can optionally include further comprising publishing the machine code.

In Example 17, the subject matter of any of Examples 1-16 can optionally include wherein publishing the machine code includes loading the machine code onto a parallel machine.

In Example 18, the subject matter of any of Examples 1-17 can optionally include wherein publishing the machine code includes storing the machine code on a computer readable medium.

In Example 19, the subject matter of any of Examples 1-18 can optionally include wherein the instructions cause the computer to perform operations comprising converting source code into the arrangement; and publishing the machine code.

In Example 20, the subject matter of any of Examples 1-19 can optionally include wherein determining whether the portion meets a condition to be mapped to a special purpose element comprises determining whether the portion is deterministic.

In Example 21, the subject matter of any of Examples 1-20 can optionally include wherein identifying a portion of the arrangement includes identifying a quantification; and wherein determining whether the portion is deterministic includes determining whether a drive expression for the quantification can be matched while the quantification is being processed.

In Example 22, the subject matter of any of Examples 1-21 can optionally include wherein identifying a portion of the arrangement includes identifying a quantification; and wherein determining whether the portion is deterministic includes determining whether a repeated expression of the quantification is a prefix of another repeated expression of the quantification.

In Example 23, the subject matter of any of Examples 1-22 can optionally include wherein identifying a portion in the arrangement includes identifying a quantification.

In Example 24, the subject matter of any of Examples 1-23 can optionally include wherein determining whether the portion is deterministic includes determining whether a drive expression for the quantification can be matched while the quantification is being processed, and determining whether a repeated expression of the quantification is a prefix of another repeated expression of the quantification.

In Example 25, the subject matter of any of Examples 1-24 can optionally include wherein the special purpose element includes a counter having a corresponding counter state in the automaton and the general purpose element includes a state machine element having a corresponding state machine element state in the automaton.

In Example 26, the subject matter of any of Examples 1-25 can optionally include wherein when the portion corresponds to a quantification and the portion is deterministic, the portion is implemented as a loop comprising a repeated expression of the quantification and a counter state, wherein the counter state is configured to count a number of times the repeated expression is matched, and wherein the counter state activates a downstream state when the repeated expression is matched a number of times specified by the quantification.

In Example 27, the subject matter of any of Examples 1-26 can optionally include wherein the loop is exited by a match with a negated version of the repeated expression.

In Example 28, the subject matter of any of Examples 1-27 can optionally include wherein when the quantification can be matched with a single number of loops, configuring the repeated expression to assert a counting input of the counter state; configuring a negated version of the repeated expression to reset the counter state; and configuring the counter state to assert an output when the counting input has been asserted a number of times equal to the number of loops without the counter state being reset.

In Example 29, the subject matter of any of Examples 1-28 can optionally include wherein when the quantification can be matched with a multiple number of loops, configuring the repeated expression to assert a counting input of a first counter state and a counting input of a second counter state; configuring the repeated expression to assert a reset input of the first counter state and a reset input of the second counter state; configuring the first counter state to assert an output when the counting input of the first counter state has been asserted a number of times equal to a low threshold of the multiple number of loops without the first counter state being reset; and configuring the second counter state to assert an output of the second counter state when the counting input of the second counter state has been asserted a number of times equal to a high threshold of the multiple number of loops without the second counter state being reset, wherein the output of the second counter state is configured to assert the reset input of the first counter state.

In Example 30, the subject matter of any of Examples 1-29 can optionally include wherein the target device comprises a parallel machine, and the first type of element is a first type of hardware element and the at least one other type of element includes a second type of hardware element.

In Example 31, the subject matter of any of Examples 1-30 can optionally include wherein the second type of hardware element can receive an input stream and provide an output as a function of the input stream; and wherein the first type of hardware element does not receive the input stream and provides an output as a function of inputs from other elements of the target device.

In Example 32, the subject matter of any of Examples 1-31 can optionally include wherein the first type of element is a counter and the second type of element is a state machine element.

In Example 33, the subject matter of any of Examples 1-32 can optionally include determining whether a regular expression is of a type that corresponds to the first type of element; and when the regular expression is not of a type that corresponds to the first type of element, map the regular expression to the at least one other type of element.

In Example 34, the subject matter of any of Examples 1-33 can optionally include wherein determine whether a regular expression is of a type that corresponds to the first type of element includes determining whether the regular expression is a quantification; and when the regular expression is not of a quantification, map the regular expression to the at least one other type of element.

In Example 35, the subject matter of any of Examples 1-34 can optionally include determining whether the quantification is deterministic; when the quantification is deterministic, map the regular expression to the first type of element; and when the quantification is not deterministic, map the regular expression to the at least one other type of element.

In Example 36, the subject matter of any of Examples 1-35 can optionally include wherein determine whether the quantification is deterministic includes determine whether a drive expression for the quantification can be matched while the quantification is being processed and whether a repeated expression of the quantification is a prefix of another repeated expression of the quantification.

In Example 37, the subject matter of any of Examples 1-36 can optionally include wherein compile includes parsing the regular expressions to form a syntax tree; converting the syntax tree into an automaton; converting the automaton into a netlist; placing instances of the netlist; and routing connections between the instances of the netlist.

In Example 38, the subject matter of any of Examples 1-37 can optionally include wherein the regular expressions comprise criteria for searching unstructured data.

In Example 39, the subject matter of any of Examples 1-38 can optionally include wherein determine whether the portion meets a condition to be mapped to a special purpose element comprises determine whether the portion is deterministic.

In Example 40, the subject matter of any of Examples 1-39 can optionally include wherein identify a portion of the arrangement includes identify a quantification; and wherein determine whether the portion is deterministic includes determine whether a drive expression for the quantification can be matched while the quantification is being processed and whether a repeated expression of the quantification is a prefix of another repeated expression of the quantification.

Example 41 includes a parallel machine programmed by an image produced using the subject matter of any of claims 1-40.

What is claimed is:

1. A non-transitory machine-readable medium including instructions that, when executed by a processor of a machine, cause the machine to perform operations comprising:
    processing a functionality description of a special purpose hardware element of a target device, the target device including both the special purpose hardware element and a plurality of general purpose hardware elements, the special purpose element being a single element implementation of a function that can be performed by a plurality of general purpose elements;
    searching for a portion of an arrangement of relationally connected operators using the functionality description;
    generating an automaton, the automaton including a special purpose state into which the portion of the arrangement of relationally connected operators are combined, wherein the special purpose state corresponds to the special purpose hardware element; and
    encoding the automaton.

2. The machine-readable medium of claim 1, wherein searching for the portion of the arrangement of relationally connected operators using the functionality description includes:
    finding a group of relationally connected operators that match the functionality description;
    testing whether the group conforms to an operational condition of the special purpose hardware element; and
    designating the group as the portion of relationally connected operators when the group conforms to the operational condition of the special purpose hardware element.

3. The machine-readable medium of claim 2, wherein the operational condition is met when an automaton of general purpose states corresponding to the group of relationally connected operators is deterministic.

4. The machine-readable medium of claim 3, wherein the automaton of general purpose states corresponding to the group of relationally connected operators is deterministic when it meets no-interference conditions.

5. The machine-readable medium of claim 4, wherein the portion of the arrangement of relationally connected operators represents a quantification, and wherein the no-interference conditions include at least one of a "no re-entrance" condition or a "no prefix" condition.

6. The machine-readable medium of claim 1, the target device includes a plurality of special purpose hardware elements, and wherein the instructions further comprise:
    searching for a set of portions of the arrangement of relationally connected operators using the functionality description, the cardinality of the set of portions being less than or equal to the cardinality of the plurality of special purpose hardware elements;
    combining each member of the set of portions into a respective single special purpose state in the automaton created from the arrangement of relationally connected operators; and
    assigning any relationally connected operator that is not in a member of the set of portions to a general purpose state in the automaton.

7. A system comprising a computer to execute instructions on a processor, the computer arranged to:
- process a functionality description of a special purpose hardware element of a target device, the target device including both the special purpose hardware element and a plurality of general purpose hardware elements, the special purpose element being a single element implementation of a function that can be performed by a plurality of general purpose elements;
- search for a portion of an arrangement of relationally connected operators using the functionality description;
- generate an automaton, the automaton including a special purpose state into which the portion of the arrangement of relationally connected operators are combined, wherein the special purpose state corresponds to the special purpose hardware element; and
- encode the automaton.

8. The system of claim 7, wherein to search for the portion of the arrangement of relationally connected operators using the functionality description includes the computer arranged to:
- find a group of relationally connected operators that match the functionality description;
- test whether the group conforms to an operational condition of the special purpose hardware element; and
- designate the group as the portion of relationally connected operators when the group conforms to the operational condition of the special purpose hardware element.

9. The system of claim 8, wherein the operational condition is met when an automaton of general purpose states corresponding to the group of relationally connected operators is deterministic.

10. The system of claim 9, wherein the automaton of general purpose states corresponding to the group of relationally connected operators is deterministic when it meets no-interference conditions.

11. The system of claim 10, wherein the portion of the arrangement of relationally connected operators represents a quantification, and wherein the no-interference conditions include at least one of a "no re-entrance" condition or a "no prefix" condition.

12. The system of claim 7, wherein the target device includes a plurality of special purpose hardware elements, and wherein the computer is further arranged to:
- search for a set of portions of the arrangement of relationally connected operators using the functionality description, the cardinality of the set of portions being less than or equal to the cardinality of the plurality of special purpose hardware elements;
- combine each member of the set of portions into a respective single special purpose state in the automaton created from the arrangement of relationally connected operators; and
- assign any relationally connected operator that is not in a member of the set of portions to a general purpose state in the automaton.

13. A machine-implemented method comprising operations executed on a processor, the operations comprising:
- processing a functionality description of a special purpose hardware element of a target device, the target device including both the special purpose hardware element and a plurality of general purpose hardware elements, the special purpose element being a single element implementation of a function that can be performed by a plurality of general purpose elements;
- searching for a portion of an arrangement of relationally connected operators using the functionality description;
- generating an automaton, the automaton including a special purpose state into which the portion of the arrangement of relationally connected operators are combined, wherein the special purpose state corresponds to the special purpose hardware element; and
- encoding the automaton.

14. The machine-implemented method of claim 13, wherein searching for the portion of the arrangement of relationally connected operators using the functionality description includes:
- finding a group of relationally connected operators that match the functionality description;
- testing whether the group conforms to an operational condition of the special purpose hardware element; and
- designating the group as the portion of relationally connected operators when the group conforms to the operational condition of the special purpose hardware element.

15. The machine-implemented method of claim 14, wherein the operational condition is met when an automaton of general purpose states corresponding to the group of relationally connected operators is deterministic.

16. The machine-implemented method of claim 15, wherein the automaton of general purpose states corresponding to the group of relationally connected operators is deterministic when it meets no-interference conditions.

17. The machine-implemented method of claim 16, wherein the portion of the arrangement of relationally connected operators represents a quantification, and wherein the no-interference conditions include at least one of a "no re-entrance" condition or a "no prefix" condition.

18. The machine-implemented method of claim 13, the operations further comprising:
- searching for a set of portions of the arrangement of relationally connected operators using the functionality description, the cardinality of the set of portions being less than or equal to the cardinality of the plurality of special purpose hardware elements;
- combining each member of the set of portions into a respective single special purpose state in the automaton created from the arrangement of relationally connected operators; and
- assigning any relationally connected operator that is not in a member of the set of portions to a general purpose state in the automaton.

* * * * *